United States Patent [19]

Cortolano et al.

[11] Patent Number: 5,004,770
[45] Date of Patent: Apr. 2, 1991

[54] POLYMERIC SUBSTRATES STABILIZED WITH N-SUBSTITUTED HINDERED AMINES

[75] Inventors: Frank P. Cortolano, Valhalla; Raymond Seltzer, New City; Ambelal R. Patel, Ardsley, all of N.Y.

[73] Assignee: Ciba-Geigy Corporation, Ardsley, N.Y.

[21] Appl. No.: 416,621

[22] Filed: Oct. 3, 1989

Related U.S. Application Data

[63] Continuation-in-part of Ser. No. 259,955, Oct. 19, 1988, abandoned.

[51] Int. Cl.$^5$ ............................................ C08K 5/3435
[52] U.S. Cl. ........................................ 524/99; 524/91; 524/99; 524/100; 524/102; 524/103; 524/394; 524/409
[58] Field of Search .................. 524/91, 95, 99, 102, 524/100, 103

[56] References Cited

U.S. PATENT DOCUMENTS

| | | | |
|---|---|---|---|
| 4,344,876 | 8/1982 | Berner | 524/99 |
| 4,426,471 | 1/1984 | Berner | 524/99 |
| 4,426,472 | 1/1984 | Berner | 524/102 |
| 4,665,185 | 5/1987 | Winter et al. | 546/192 |
| 4,691,015 | 9/1987 | Behrens et al. | 524/102 |

OTHER PUBLICATIONS

Shlyapintokh et al., "Developments in Polymer Stabilisation," V, 41–70, (1982).

*Primary Examiner*—Kriellion Morgan
*Attorney, Agent, or Firm*—Harry Falber

[57] ABSTRACT

Hindered amines based on various 2,2,6,6-tetralkylated nitrogen-containing heterocyclic moieties wherein the hindered nitrogen atom on the ring is substituted with OH or OR substituents and the 4-position of the ring is substituted with a diversity of substituents are effective in protecting a variety of non-polyolefin substrates against the adverse effects of light, heat and oxygen.

23 Claims, No Drawings

POLYMERIC SUBSTRATES STABILIZED WITH N-SUBSTITUTED HINDERED AMINES

RELATED APPLICATION

This application is a continuation-in-part of application Ser. No. 259,955, filed Oct. 19, 1988 now abandoned.

It is well known that polymeric substrates undergo progressive changes in their physical properties, including color changes, embrittlement and loss of mechanical properties, when exposed to processing conditions or to sunlight or other sources of ultraviolet radiation. Retardation of these deleterious effects has been achieved utilizing a broad range of additives, including those exhibiting light-stabilizing properties, such additives including benzophenones, benzotriazoles, substituted benzoic acid esters, nickel complexes, aromatic oxamides and sterically hindered amines.

The latter group of chemicals and their stabilizing activity in a wide variety of substrates are likewise well known and have been described in a broad range of patents and technical literature. In view of the extensive nature of such art, reference is made to U.S. Pat. Nos. 4,426,471, 4,426,472, 4,344,876, 4,590,231 and U.S. Pat. No. 4,691,015 for a summary of representative hindered amine light stabilizers.

It has now been surprisingly determined that the polymeric substrates recited herein can be effectively stabilized by the incorporation therein of the indicated N—OH and N—OR$_1$ substituted hindered amines. Thus, these compounds serve to protect the polymeric materials against the adverse effects of actinic, oxidative and thermal degradation. In particular, they serve to reduce color formation resulting from processing conditions and are especially effective in stabilizing organic materials against the degradative effects of actinic stimuli. Since these stabilizers are considerably less basic than conventional hindered amines, they also have little or no detrimental effect on the thermal stability of the polymer during processing at elevated temperatures. Certain effects are specifically to be noted in polyvinyl chloride formulations wherein conventional hindered amines adversely impact on thermal stability during processing. Thus, these PVC formulations contain various organotin and/or mixed metal heat stabilizers for the specific purpose of providing thermal stability during processing and subsequent use. The conventional hindered amines added to provide light stability negate at least a portion of the thermal stability thereby resulting in discolored and/or degraded products. In contrast, the substitution pattern of the instant compounds, particularly the -NOAlkyl compounds, provides the desired long term light stability without a substantial concomitant negation of thermal stability. Improvements are also to be seen in weatherability during outdoor exposure. In addition, the instant compounds significantly reduce the pigment interactions such as color drift and flocculation encountered with the conventional hindered amines when present in pigmented substrates.

The substituted hindered amine compounds applicable for use in this invention contain a group of the formula

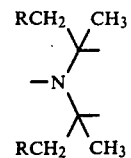

wherein the N-substituent is —OH or —OR$_1$ with R and R$_1$ being defined hereinafter.

Some are known compounds while others are claimed in copending applications Ser. No. 99,414, 99,418 and 99,419 now abandoned.

More particularly, the instant invention relates to the use of a derivative having one of formulae A to P

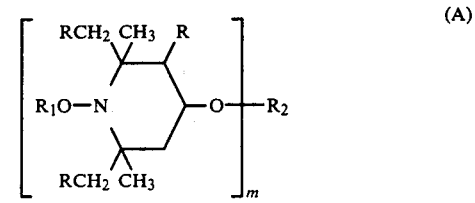
(A)

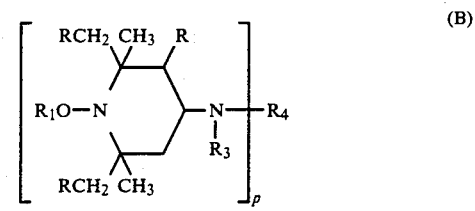
(B)

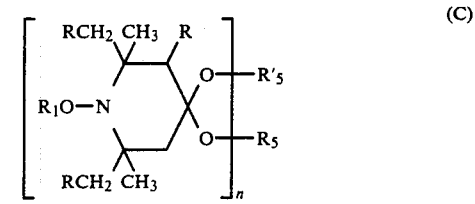
(C)

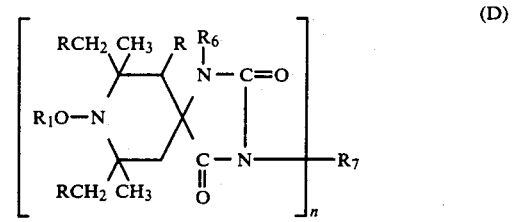
(D)

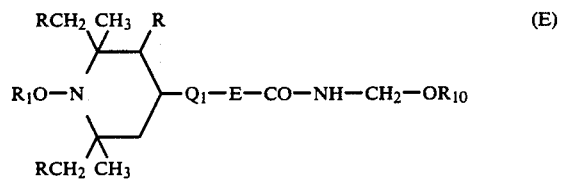
(E)

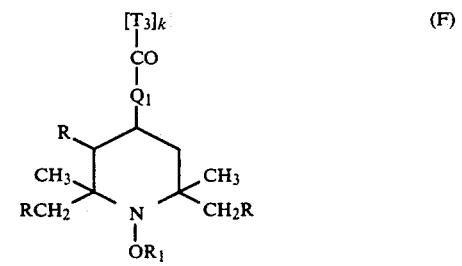
(F)

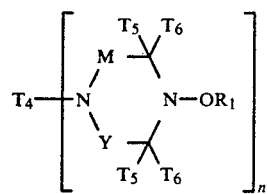 (G)

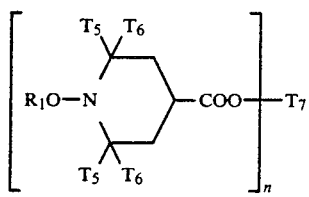 (H)

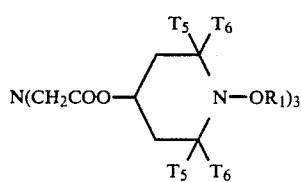 (I)

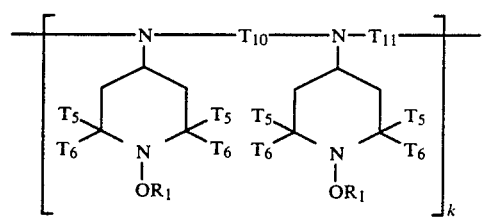 (J)

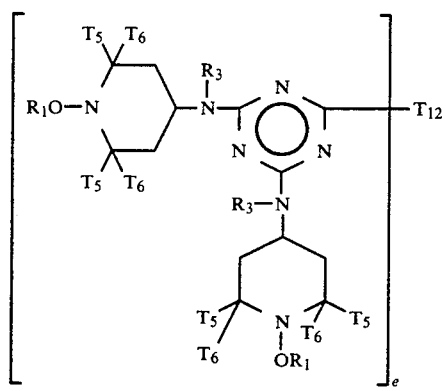 (K)

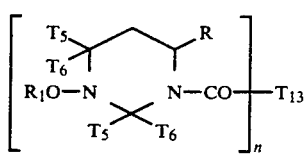 (L)

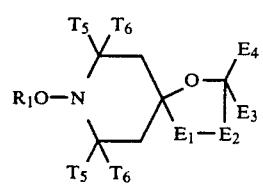 (M)

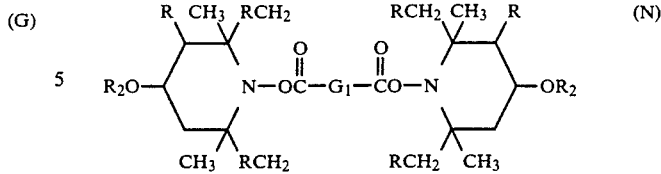 (N)

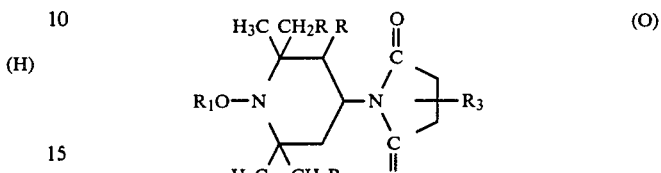 (O)

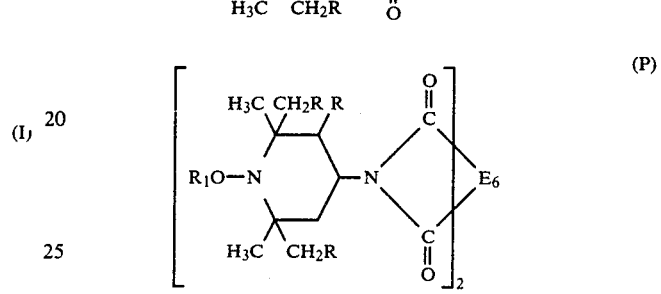 (P)

wherein

R is hydrogen or methyl, $R_1$ is independently hydrogen, $C_1$-$C_{18}$ alkyl, $C_2$-$C_{18}$ alkenyl, $C_2$-$C_{18}$ alkynyl, $C_5$-$C_{12}$ cycloalkyl, $C_6$-$C_{10}$ bicycloalkyl, $C_5$-$C_8$ cycloalkenyl, $C_6$-$C_{10}$ aryl, $C_7$-$C_9$ aralkyl, $C_7$-$C_9$ aralkyl substituted by alkyl or aryl, or $$-\overset{O}{\underset{\|}{C}}-D$$

wherein D is $C_1$-$C_{18}$ alkyl, $C_1$-$C_{18}$ alkoxy, phenyl, phenyl substituted by hydroxy, alkyl or alkoxy, or amino or amino mono- or disubstituted by alkyl or phenyl;

m is 1-4, when m is 1, $R_2$ is hydrogen, $C_1$-$C_{18}$ alkyl optionally interrupted by one or more oxygen atoms, $C_2$-$C_{12}$ alkenyl, $C_6$-$C_{10}$ aryl, $C_7$-$C_{18}$ aralkyl, glycidyl, a monovalent acyl radical of an aliphatic, cycloaliphatic, araliphatic or aromatic carboxylic acid, or of a carbamic acid, preferably an acyl radical of an aliphatic carboxylic acid having 2-18 C atoms, of a cycloaliphatic carboxylic acid having 5-12 C atoms or of an aromatic carboxylic acid have 7-15 C atoms, or

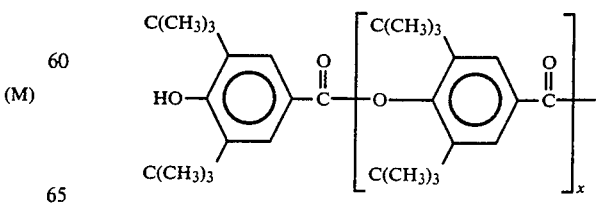

wherein x is 0 or 1, or

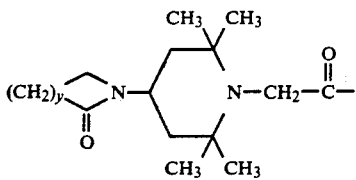

wherein y is 2-4;

when m is 2,

R$_2$ is C$_1$-C$_{12}$ alkylene, C$_4$-C$_{12}$ alkenylene, xylylene, a divalent acyl radical of an aliphatic, cycloaliphatic, araliphatic or aromatic dicarboxylic acid or of a dicarbamic acid, preferably an acyl radical of an aliphatic dicarboxylic acid having 2-18 C atoms, of a cycloaliphatic or aromatic dicarboxylic acid having 8-14 C atoms, or of an aliphatic, cycloaliphatic or aromatic dicarbamic acid having 8-14 C atoms;

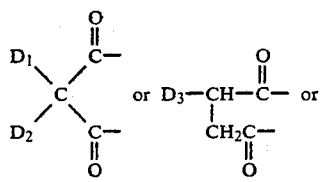

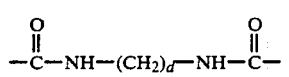

wherein D$_1$ and D$_2$ are independently hydrogen, an alkyl radical containing up to 8 carbon atoms, an aryl or aralkyl radical including 3,5-di-t-butyl-4-hydroxybenzyl radical, D$_3$ is hydrogen, or an alkyl or alkenyl radical containing up to 18 carbon atoms, and d is 0-20;

when m is 3, R$_2$ is a trivalent acyl radical of an aliphatic, unsaturated aliphatic, cycloaliphatic, or aromatic tricarboxylic acid;

when m is 4, R$_2$ is a tetravalent acyl radical of a saturated or unsaturated aliphatic or aromatic tetracarboxylic acid including 1,2,3,4-butanetetracarboxylic acid, 1,2,3,4-but-2-enetetracarboxylic acid, and 1,2,3,5- and 1,2,4,5-pentanetetracarboxylic acid;

p is 1, 2 or 3,

R$_3$ is hydrogen, C$_1$-C$_{12}$ alkyl, C$_5$-C$_7$ cycloalkyl, C$_7$-C$_9$ aralkyl, C$_2$-C$_{18}$ alkanoyl, C$_3$-C$_5$ alkenoyl or benzoyl;

when p is 1,

R$_4$ is hydrogen, C$_1$-C$_{18}$ alkyl, C$_5$-C$_7$ cycloalkyl, C$_2$-C$_8$ alkenyl unsubstituted or substituted by a cyano, carbonyl or carbamide group, aryl, aralkyl, or it is glycidyl, a group of the formula —CH$_2$—CH(OH)—Z or of the formula —CO—Z or —CONH—Z wherein Z is hydrogen, methyl or phenyl; or a group of the formulae

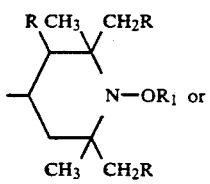

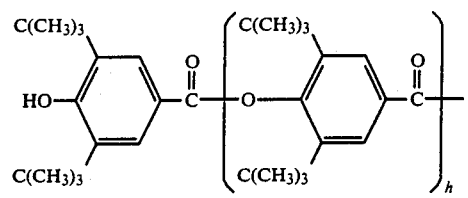

with h as 0 or 1;

or R$_3$ and R$_4$ together when p is 1 can be alkylene of 4 to 6 carbon atoms or 2-oxo-polyalkylene or the cyclic acyl radical of an aliphatic or aromatic 1,2- or 1,3-dicarboxylic acid, when p is 2, R$_4$ is a direct bond or is C$_1$-C$_{12}$ alkylene, C$_6$-C$_{12}$ arylene, xylylene, a —CH$_2$CH(OH)—CH$_2$ group, or a group —CH$_2$—CH(OH)—CH$_2$—O—X—O—CH$_2$—CH(OH)—CH$_2$— wherein X is C$_2$-C$_{10}$ alkylene, C$_6$-C$_{15}$ arylene or C$_6$—C$_{12}$ cycloalkylene; or, provided that R$_3$ is not alkanoyl, alkenoyl or benzoyl, R$_4$ can also be a divalent acyl radical of an aliphatic, cycloaliphatic or aromatic dicarboxylic acid or dicarbamic acid, or can be the group —CO—; or R$_4$ is

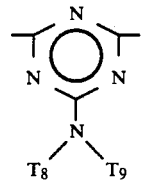

where T$_8$ and T$_9$ are independently hydrogen, alkyl of 1 to 18 carbon atoms, or T$_8$ and T$_9$ together are alkylene of 4 to 6 carbon atoms or 3-oxapentamethylene, preferably T$_8$ and T$_9$ together are 3-oxapentamethylene;

when p is 3,

R$_4$ is 2,4,6-triazinyl, n is 1 or 2, when n is 1,

R$_5$ and R′$_5$ are independently C$_1$-C$_{12}$ alkyl, C$_2$—C$_{12}$ alkenyl, C$_7$—C$_{12}$ aralkyl, or R$_5$ is also hydrogen, or R$_5$ and R′$_5$ together are C$_2$-C$_8$ alkylene or hydroxyalkylene or C$_4$-C$_{22}$ acyloxyalkylene;

when n is 2,

R$_5$ and R′$_5$ together are (—CH$_2$)$_2$C(CH$_2$—)$_2$;

R$_6$ is hydrogen, C$_1$-C$_{12}$ alkyl, allyl, benzyl, glycidyl or C$_2$-C$_6$ alkoxyalkyl;

when n is 1,

R$_7$ is hydrogen, C$_1$-C$_{12}$ alkyl, C$_3$-C$_5$ alkenyl, C$_7$-C$_9$ aralkyl, C$_5$-C$_7$ cycloalkyl, C$_2$-C$_4$ hydroxyalkyl, C$_2$-C$_6$ alkoxyalkyl, C$_6$-C$_{10}$ aryl, glycidyl, a group of the formula —(CH$_2$)$_t$—COO—Q or of the formula —(CH$_2$)$_t$—O—CO—Q wherein t is 1 or 2, and Q is C$_1$-C$_4$ alkyl or phenyl; or when n is 2, R$_7$ is C$_2$-C$_{12}$ alkylene, C$_6$-C$_{12}$ arylene, a group —CH$_2$CH(OH)—CH$_2$—O—X—O—CH$_2$—CH(OH)—CH$_2$— wherein X is C$_2$-C$_{10}$ alkylene, C$_6$-C$_{15}$ arylene or C$_6$-C$_{12}$ cycloalkylene, or a group —CH$_2$CH(OZ′)CH$_2$—(OCH$_2$—CH(OZ′)CH$_2$)$_2$— wherein Z′ is hydrogen, C$_1$-C18 alkyl, allyl, benzyl, C$_2$-C$_{12}$ alkanoyl or benzoyl;

Q$_1$ is —N(R$_8$)— or —O—;-. E is C$_1$-C$_3$ alkylene, the group —CH$_2$—CH(R$_9$)—O— wherein R$_9$ is hydrogen, methyl or phenyl, the group —(CH₂)₃—NH— or a direct bond;

R₁₀ is hydrogen or C₁-C₁₈ alkyl, R₈ is hydrogen, C₁-C₁₈ alkyl, C₅-C₇ cycloalkyl, C₇-C₁₂ aralkyl, cyanoethyl, C₆-C₁₀ aryl, the group —CH₂—CH(R₉)—OH wherein R₉ has the meaning defined above; a group of the formula

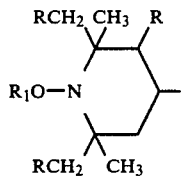

or a group of the formula

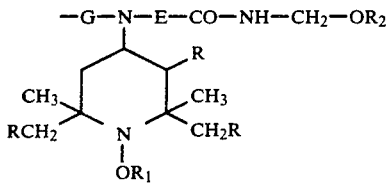

wherein G is C₂-C₆ alkylene or C₆-C₁₂ arylene; or R₈ is a group —E—CO—NH—CH₂—OR₁₀;

Formula F denotes a recurring structural unit of a polymer where T₃ is ethylene or 1,2-propylene, or is the repeating structural unit derived from an alpha-olefin copolymer with an alkyl acrylate or methacrylate; preferably a copolymer of ethylene and ethyl acrylate, and where k is 2 to 100;

T₄ has the same meaning as R₄ when p is 1 or 2,

T₅ is methyl,

T₆ is methyl or ethyl, or T₅ and T₆ together are tetramethylene or pentamethylene, preferably T₅ and T₆ are each methyl, M and Y are independently methylene or carbonyl preferably M is methylene and Y is carbonyl, and T₄ is ethylene where n is 2;

T₇ is the same as R₇, and T₇ is preferably octamethylene where n is 2,

T₁₀ and T₁₁ are independently alkylene of 2 to 12 carbon atoms, or T₁₁ is

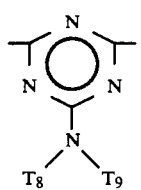

T₁₂ is piperazinyl,

—NR₁₁—(CH₂)$_d$—NR₁₁— or

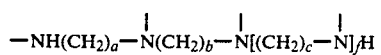

where R₁₁ is the same as R₃ or is also

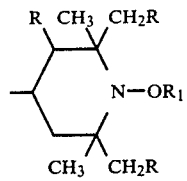

a, b and c are independently 2 or 3, and f is 0 or 1, preferably a and c are each 3, b is 2 and f is 1; and e is 2, 3 or 4, preferably 4;

T₁₃ is the same as R₂ with the proviso that T₁₃ cannot be hydrogen when n is 1;

E₁ and E₂, being different, each are —CO— or —N-(E₅)— where E₅ is hydrogen, C₁-C₁₂ alkyl or C₄-C₂₂ alkoxycarbonylalkyl, preferably E₁ is —CO— and E₂ is —N(E₅)—, E₃ is hydrogen, alkyl of 1 to 30 carbon atoms, phenyl, naphthyl, said phenyl or said naphthyl substituted by chlorine or by alkyl of 1 to 4 carbon atoms, or phenylalkyl of 7 to 12 carbon atoms, or said phenylalkyl substituted by alkyl of 1 to 4 carbon atoms, E₄ is hydrogen, alkyl of 1 to 30 carbon atoms, phenyl, naphthyl or phenylalkyl of 7 to 12 carbon atoms, or E₃ and E₄ together are polymethylene of 4 to 17 carbon atoms, or said polymethylene substituted by up to four alkyl groups of 1 to 4 carbon atoms, preferably methyl, and E₆ is an aliphatic or aromatic tetravalent radical.

In the structures A to P, if any substituents are C₁-C₁₈ alkyl, they are for example methyl, ethyl, n-propyl, n-butyl, sec-butyl, tert-butyl, n-hexyl, n-octyl, 2-ethylhexyl, n-nonyl, n-decyl, n-undecyl, n-dodecyl, n-tridecyl, n-tetradecyl, n-hexadecyl or n-octadecyl. Typical cycloalkyl groups include cyclopentyl and cyclohexyl; typical cycloalkenyl groups include cyclohexenyl; while typical aralkyl groups include benzyl, alpha-methyl-benzyl, alpha,alpha-dimethylbenzyl or phenethyl. C₁-C₁₂ alkyl and cyclohexyl are preferred.

If R₂ is a monovalent acyl radical of a carboxylic acid, it is for example an acyl radical of acetic acid, stearic acid, salicylic acid, benzoic acid or β-(3,5-di-tert-butyl-4-hydroxyphenyl) propionic acid.

If R₂ is a divalent acyl radical of a dicarboxylic acid, it is for example an acyl radical of oxalic acid, adipic acid, succinic acid, suberic acid, sebacic acid, phthalic acid dibutylmalonic acid, dibenzylmalonic acid or butyl-(3,5-di-tert-butyl-4-hydroxybenzyl)-malonic acid, or bicycloheptenedicarboxylic acid, with succinates, sebacates, phthalates and isophthalates being preferred.

If R₂ is a divalent acyl radical of a dicarbamic acid, it is for example an acyl radical of hexamethylenedicarbamic acid or of 2,4-toluylenedicarbamic acid.

The following compounds are examples of polyalkylpiperidine starting materials useful in making the hydroxylamine derivatives of formula A.

4-benzyloxy-2,2,6,6-tetramethylpiperidine
4-acryloyloxy-2,2,6,6-tetramethylpiperidine
4-hydroxy-2,2,6,6-tetramethylpiperidine
4-stearoyloxy-2,2,6,6-tetramethylpiperidine
di-(2,2,6,6-tetramethylpiperidin-4-yl) adipate
di-(2,2,6,6-tetramethylpiperidin-4-yl) sebacate
di-(2,2,6,6-tetramethylpiperidin-4-yl)phthalate
alpha,alpha'-(di-2,2,6,6-tetramethyl piperidine-4-oxy)-p-xylene
di-(2,2,6,6-tetramethylpiperidin-4-yl)succinate
di-(2,2,6,6-tetramethylpiperidin-4-yl)malonate 1,4-dihydroxy-2,2,6,6-tetramethylpiperidine
1-acetoxy-4-hydroxy-2,2,6,6-tetramethylpiperidine
(2,2,6,6-tetramethylpiperidin-4-yl)-[4-(2-oxoazepin-1-yl)-2,2,6,6-tetramethylpiperidin-4-yl]acetate.

As $C_7$–$C_9$ aralkyl, $R_3$ is particularly phenethyl or above all benzyl.

As $C_2$–$C_{18}$ alkanoyl, $R_3$ for example propionyl, butyryl, octanoyl, dodecanoyl, hexadecanoyl, octadecanoyl, but preferably acetyl; and a $C_3$–$C_5$ alkenoyl, $R_3$ is in particular acryloyl.

If $R_4$ is $C_2$–$C_8$ alkenyl unsubstituted or substituted by a cyano, carbonyl or carbamide group, it is for example 1-propenyl, allyl, methallyl, 2-butenyl, 2-pentenyl, 2-hexenyl, 2-octenyl, 2,2-dicyanovinyl, 1-methyl-2-cyano-2-methoxycarbonyl-vinyl or 2,2-diacetylaminovinyl.

If any substituents are $C_2$–$C_{12}$ alkylene, they are for example ethylene, propylene, 2,2-dimethylpropylene, tetramethylene, hexamethylene, octamethylene, decamethylene or dodecamethylene.

If any substituents are $C_6$–$C_{15}$ arylene, they are for example o-, m- or p-phenylene, 1,4-naphthylene or 4,4'-diphenylene.

As $C_6$–$C_{12}$ cycloalkylene, X is especially cyclohexylene.

The following compounds are examples of polyalkylpiperidine starting materials useful in making the hydroxylamine derivatives of formula B.
N,N'-bis(2,2,6,6-tetramethylpiperidin-4-yl)-hexamethylene-1,6-diamine,
N,N'-bis-(2,2,6,6-tetramethylpiperidin-4-yl)-hexamethylene-1,6-diacetamide,
4-benzylamino-2,2,6,6-tetramethylpiperidine,
N-n-butyl-N-(2,2,6,6-tetramethylpiperidin-4-yl)-4-hydroxy-3,5-di-tert.butyl benzamide,
N,N'-bis-(2,2,6,6-tetramethylpiperidin-4-yl)-N,N'-dibutyl-adipamide,
N,N'-bis-(2,2,6,6-tetramethylpiperidin-4-yl)-N,N'-dicyclohexyl-(2-hydroxypropylene-diamine),
N,N'-bis-(2,2,6,6-tetramethylpiperidin-4-yl)-p-xylylenediamine,
4-(3-methyl-4-hydroxy-5-tert-butyl-benzoyl acetamido)-2,2,6,6-tetramethylpiperidine,
alpha-cyano-β-methyl-β-[N-(2,2,6,6-tetramethylpiperidin-4-yl]-amino-acrylic acid methyl ester
1-acetoxy-N-butylamino-2,2,6,6-tetramethylpiperidine
1-oxyl-2,2,6,6-tetramethylpiperidin-4-one If $R_5$ is $C_2$–$C_8$ alkylene or hydroxyalkylene, it is for example ethylene, 1-methyl-ethylene, propylene, 2-ethylpropylene or 2-ethyl-2-hydroxymethylpropylene.

As $C_4$–$C_{22}$ acyloxyalkylene, $R_5$ is for example 2-ethyl-2-acetoxymethyl-propylene.

The following compounds are examples for polyalkylpiperidine starting materials useful in making the hydroxylamine derivatives of formula C.
9-aza-8,8,10,10-tetramethyl-1,5-dioxaspiro[5.5]undecane,
9aza-8,8,10,10-tetramethyl-3-ethyl-1,5-dioxaspiro[5.5]undecane,
2,2,6,6-tetramethylpiperidine-4-spiro-2'-(1',3'-dioxane)-5'-spiro-5''-(1'',3''-dioxane)-2''-spiro-4'''-(2''',2'''-6''',6'''-tetramethylpiperidine).

If any substituents are $C_2$–$C_6$ alkoxyalkyl, they are for example methoxymethyl, ethoxymethyl, propoxymethyl, tert-butoxyethyl, ethoxyethyl, ethoxypropyl, n-butoxymethyl, tert-butoxyethyl, isopropoxyethyl or propoxypropyl.

If $R_7$ is $C_3$–$C_5$ alkenyl, it is for example 1-propenyl, allyl, methallyl, 2-butenyl or 2-pentenyl.

As $C_7$–$C_9$ aralkyl, $R_7$ is in particular phenethyl or above all benzyl; and as $C_5$–$C_7$ cycloalkyl, $R_7$ is especially cyclohexyl.

If $R_7$ is $C_2$–$C_4$ hydroxyalkyl, it is for example 2-hydroxyethyl, 2-hydroxypropyl, 3-hydroxypropyl, 2-hydroxybutyl or 4-hydroxybutyl.

As $C_6$–$C_{10}$ aryl, $R_7$ is in particular phenyl, or alpha- or β-naphthyl which is unsubstituted or substituted by halogen or $C_1$–$C_4$ alkyl.

If $R_7$ is $C_2$–$C_{12}$ alkylene, it is for example ethylene, propylene 2,2-dimethylpropylene, tetramethylene, hexamethylene, octamethylene, decamethylene or dodecamethylene.

If $R_7$ is $C_6$–$C_{12}$ arylene, it is for example o-, m- or p-phenylene, 1,4-naphthylene or 4,4'-diphenylene.

If Z' is $C_2$–$C_{12}$ alkanoyl, it is for example propionyl, butyryl, octanoyl, dodecanoyl or preferably acetyl.

The following compounds are examples of polyalkylpiperidine starting materials useful in making hydroxylamine derivatives of formula D.
3-benzyl-1,3,8-triaza-7,7,9,9-tetramethylspiro[4.5]decane-2,4-dione,
3-n-octyl-1,3,8-triaza-7,7,9,9-tetramethylspiro[4.5]decane-2,4-dione,
3-allyl-1,3,8-triaza-1,7,7,9,9-pentamethylspiro[4.5]decane-2,4-dione,
or the compounds of the following formulae:

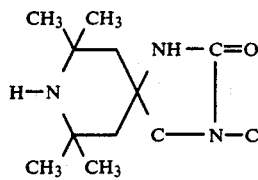 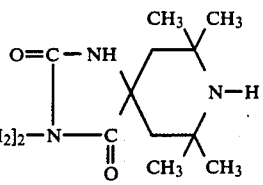

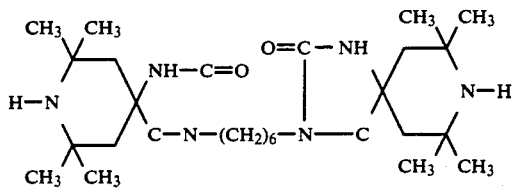

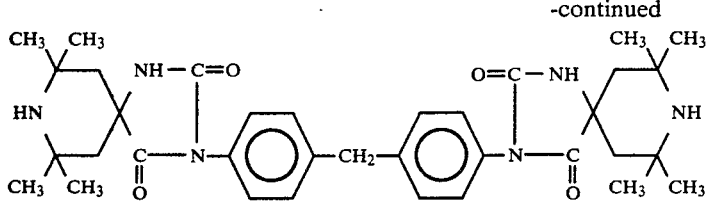

As $C_5$–$C_7$ cycloalkyl, $R_8$ is in particular cyclohexyl.

As $C_6$–$C_{10}$ aryl, $R_8$ is particularly phenyl, or alpha-or β-naphthyl which is unsubstituted or substituted with halogen or $C_1$–$C_4$ alkyl.

As $C_1$–$C_3$ alkylene, E is for example methylene, ethylene or propylene.

As $C_2$–$C_6$ alkylene, G is for example ethylene, propylene, 2,2-dimethylpropylene, tetramethylene or hexamethylene; and as $C_6$–$C_{12}$ arylene, G is o-, m- or p-phenylene, 1,4-naphthylene or 4,4'-diphenylene.

The following compounds are examples of polyalkylpiperidine starting materials useful in making the hydroxylamine derivatives of formula E.

N-hydroxymethyl-N'-2,2,6,6-tetramethylpiperidin-4-yl-urea,

N-methoxymethyl-N'-2,2,6,6-tetramethylpiperidin-4-yl urea,

N-methoxymethyl-N'-n-dodecyl-N'-2,2,6,6-tetramethylpiperidin-4-yl-urea, and

O-(2,2,6,6-tetramethylpiperidin-4-yl)-N-methoxymethylurethane.

When the instant hydroxylamine derivative is of formula F, the following polymeric compounds are examples of starting materials useful in preparing said derivatives.

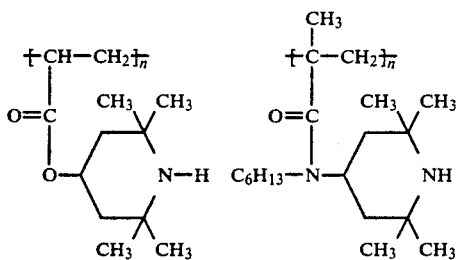

Additional starting hindered amine derivatives include for formula J:
poly-{[6-[(1,1,3,3-tetramethylbutyl)-imino]-1,3,5-triazine-2,4-diyl][2-(1-oxyl-2,2,6,6-tetramethyl piperidyl)-imino]-hexamethylene-4[4-(1-oxyl-2,2,6,6-tetramethylpiperidyl]-imino]}, For compounds of formula O, $R_3$ is preferably $C_1$–$C_{12}$ alkyl and $C_5$–$C_7$ cycloalkyl and more preferably methyl, octyl, dodecyl and cyclohexyl.

For compounds of formula P, the following species are typical of tetracarboxylic acid dianhydrides suitable for the preparation thereof:

2,3,9,10-perylene tetracarboxylic acid dianhydride
1,4,5,8-naphthalene tetracarboxylic acid dianhydride
2,6-dichloronaphthalene-1,4,5,8-tetracarboxylic acid dianhydride
2,7-dichloronaphthalene-1,4,5,8-tetracarboxylic acid dianhydride
2,3,6,7-tetrachloronaphthalene-1,4,5,8-tetracarboxylic acid dianhydride
phenanthrene-1,8,9,10-tetracarboxylic acid dianhydride
2,3,3',4'-benzophenonetetracarboxylic acid dianhydride
pyromellitic dianhydride
3,3',4,4'-benzophenonetetracarboxylic acid dianhydride
2,2',3,3'-benzophenonetetracarboxylic acid dianhydride
3,3',4,4'-biphenyltetracarboxylic acid dianhydride
2,2',3,3'-biphenyltetracarboxylic acid dianhydride
4,4'-isopropylidenediphthalic anhydride
3,3'-isopropylidenediphthalic anhydride
4,4'-oxydiphthalic anhydride
4,4'-sulfonyldiphthalic anhydride
3,3'-oxydiphthalic anhydride
4,4'-methylenediphthalic anhydride
4,4'-thiodiphthalic anhydride
4,4'-ethylidenediphthalic anhydride
2,3,6,7-naphthalenetetracarboxylic acid dianhydride
1,2,4,5-naphthalenetetracarboxylic acid dianhydride
1,2,5,6-naphthalenetetracarboxylic acid dianhydride
benzene-1,2,3,4-tetracarboxylic acid dianhydride
pyrazine-2,3,5,6-tetracarboxylic acid dianhydride.

The following compounds are examples of hydroxylamines derivatives applicable for use in the invention:

1. di-(1-acetoxy-2,2,6,6-tetramethylpiperidin-4-yl)phthalate
2. di-(1-acetoxy-2,2,6,6-tetramethylpiperidin-4-yl)isophthalate
3. di-(1-acetoxy-2,2,6,6-tetramethylpiperidin-4-yl) sebacate
4. di-(1-acetoxy-2,2,6,6-tetramethylpiperidin-4-yl) succinate
5. di-(1-acetoxy-2,2,6,6-tetramethylpiperidin-4-yl) adipate
6. di-(1-acetoxy-2,2,6,6-tetramethylpiperidin-4-yl) n-butylmalonate
7. di-(1-acetoxy-2,2,6,6-tetramethylpiperidin-4-yl) 2,2-diethylmalonate
8. poly-{[6-[(1,1,3,3-tetramethylbutyl)-imino]-1,3,5triazine-2,4-diyl][2-(1-acetoxy-2,2,6,6-tetramethylpiperidyl)-imino]-hexamethylene-[4-(1-acetoxy2,2,6,6-tetramethylpiperidyl)-imino]}
9. 1,4-diacetoxy-2,2,6,6-tetramethylpiperidine
10. 1-acetoxy-4-hydroxy-2,2,6,6-tetramethylpiperidine
11. di-(1-propionoxy-2,2,6,6-tetramethylpiperidine-4-yl)adipate
12. di-(4-benzoyloxy-2,2,6,6-tetramethylpiperidine-4-yl)oxalate
13. (1-acetoxy-2,2,6,6-tetramethylpiperidin-4-yl)-4-hydroxy-3,5-di-tert.butylbenzoate
14. 2-(4-hydroxy-3,5-di-tert.butylbenzyl)2-(1-acetoxy-2,2,6,6-tetramethylpiperidin-4-yl) n-butylmalonate
15. N-(1-acetoxy-2,2,6,6-tetramethylpiperidin-4-yl)-N-(n-butyl)-4-(4-hydroxy-3,5-di-tert.butylbenzoyloxy)-3,5-di-tert.butylbenzamide
16. 1,6-di-(N-acetyl-N-(1-acetoxy-2,2,6,6-tetramethylpiperidin-4-yl)]aminohexane
17. di-(1-acetoxy-2,2,6,6-tetramethylpiperidin-4-yloxy)-hexane-1,6-dicarbamate
18. 1-acetoxy-4-(N-acetyl-N-n-dodecylamino)-2,2,6,6-tetramethylpiperidine 19. di-(1-propionoxy-2,2,6,6-tetramethylpiperidin-4-yl) succinate
20. di-(4-n-octadecanoyloxy-2,2,6,6-tetramethylpiperazin-1-yl)oxalate
21. 1,4-di-(2-ethylhexanoyloxy)-2,2,6,6-tetramethylpiperidine
22. di-(1-benzoyloxy-2,2,6,6-tetramethylpiperidin-4-yl) sebacate
23. 1-benzoyloxy-4-(N-n-butyl-N-benzoylamino)-2,2,6,6-tetramethylpiperidine
24. 1-(1-benzoyloxy-2,2,6,6-tetramethylpiperdin-4-yl)azepin-2-one
25. [1-benzoyloxy-1'-benzyloxy-di-(2,2,6,6-tetramethylpiperidin-4-yl)]isophthalate
26. 1,4-di-(4-hydroxy-3,5-di-tert-butylbenzoyloxy)2,2,6,6-tetramethylpiperidine
27. n-butyl-(4-benzoyloxy-2,2,6,6-tetramethylpiperidin-4-yl)carbonate
28. 1-carbamoyloxy-4-benzoyloxy-2,2,6,6-tetramethylpiperidine
29. di(1-carbamoyloxy-2,2,6,6-tetramethylpiperidin-4-yl)sebacate
30. di-(1-n-butylcarbamoyloxy-2,2,6,6-tetramethylpiperidin-4-yl)2,2-diethylmalonate
31. di-(4-benzoyloxy-2,2,6,6-tetramethylpiperidin-1-yl)2,4,4-trimethylhexane-1,6-dicarbamate
32. alpha,alpha'-(di-1-ethoxy-2,2,6,6-tetramethylpiperidin-4-yloxy)-p-xylene
33. 4-benzyloxy-1-ethoxy-2,2,6,6-tetramethylpiperidine
34. 1,4-dibenzyloxy-2,2,6,6-tetramethylpiperidine
35. alpha,alpha'-(di-1-benzyloxy-2,2,6,6-tetramethylpiperidin-4-yloxy)-p-xylene
36. di-(1-benzyloxy-2,2,6,6-tetramethylpiperidin-4-yl)sebacate
37. 4-benzoyloxy-1-(alpha-methylbenzyloxy)2,2,6,6-tetramethylpiperidine
38. di-[1-(alpha-methylbenzyloxy)-2,2,6,6-tetramethylpiperidin-4-yl]sebacate
39. 1,4-dimethoxy-2,2,6,6-tetramethylpiperidine
40. 4-benzoyloxy-1-methoxy-2,2,6,6-tetramethylpiperidine
41. di-(1-methoxy-2,2,6,6-tetramethylpiperidin-4-yl) sebacate
42. di-(1-methoxy-2,2,6,6-tetramethylpiperidin-4-yl)succinate
43. (1-cyclohexyloxy-2,2,6,6-tetramethylpiperidin-4-yl)3,5-di-t.butyl-4-hydroxybenzoate
44. 1-cyclohexyloxy-4-octadecanoyloxy-2,2,6,6-tetramethylpiperidine
45. di-(1-methoxy-2,2,6,6-tetramethylpiperidin-4-yl)isophthalate
46. di-(1-cyclohexyloxy-2,2,6,6-tetramethylpiperidin-4-yl)sebacate
47. di-(1-cyclohexyloxy-2,2,6,6-tetramethylpiperidin-4-yl)isophthalate
48. di-(1-heptyloxy-2,2,6,6-tetramethylpiperidin-4-yl)sebacate
49. di-[1-(alpha-methylbenzyloxy)-2,2,6,6-tetramethylpiperidin-4-yl]terephthalate
50. di-(1-ethoxy-2,2,6,6-tetramethylpiperidin-4-yl)sebacate
51. di-(1-cumyloxy-2,2,6,6-tetramethylpiperidin-4-yl)sebacate
52. 3,15-di-alpha-methylbenzyloxy-2,2,4,4,14,14,16,16-octamethyl-7,11,18,21-tetraoxa-3,15-diazatrispiro[5.2.2.5.2.2]heneicosane
53. 3,15-dicyclohexyloxy-2.2,,4,4,14,14,16,16-octamethyl-7,11,18,21-tetraoxa-3,15-diazatrispiro[5.2.2.5.2.2-]heneicosane
54. di-(1-cyclohexyloxy-2,2,6,6-tetramethylpiperidin-4-yl)succinate
55. di-[1-(alpha-methylbenzyloxy)-2,2,6,6-tetramethylpiperidin-4-yl]succinate
56. di-(1-nonyloxy-2,2,6,6-tetramethylpiperidin-4-yl)sebacate
57. di-(1-octadecyloxy-2,2,6,6-tetramethylpiperidin-4-yl)sebacate
58. di-(1-nonyloxy-2,2,6,6-tetramethylpiperidin-4-yl)succinate
59. di-[1-(1-methylcyclohexyloxy)-2,2,6,6-tetramethylpiperidin-4-yl]sebacate
60. di-[1-(3-cyclohexen-1-yloxy)-2,2,6,6-tetramethylpiperidin-4-yl]sebacate
61. di-(1-tert.butoxy-2,2,6,6-tetramethylpiperidin-4-yl)sebacate
62. di-(1-carbamoyloxy-2,2,6,6-tetramethylpiperidin-4-yl)n-butylmalonate
63. di-[1-(bicyclo-[4.4.0]-decyl-1-oxy)-2,2,6,6tetramethylpiperidin-4-yl]sebacate
64. di-(1-n-butylcarbamoyloxy-2,2,6,6-tetramethylpiperidin-4-yl)phthalate
65. di-(1-n-butylcarbamoyloxy-2,2,6,6-tetramethylpiperidin-4-yl)n-butylmalonate
66. di-(1-phenylcarbamoyloxy-2,2,6,6-tetramethylpiperidin-4-yl)sebacate
67. 4-benzoyloxy-1-benzyloxy-2,2,6,6-tetramethylpiperidine
68. di-(1-methoxy-2,2,6,6-tetramethylpiperidin-4-yl)(3,5-di-tert.butyl-4-hydroxybenzyl) n-butylmalonate
69. 8-alpha-methylbenzyloxy-7,7,9,9-tetramethyl-8-aza-1,4-dioxaspiro[4.5]decane
70. di-(1-cyclohexyloxy-2,2,6,6-tetramethylpiperidin-4-yl)(3,5-di-tert.butyl-4-hydroxybenzyl) n-butylmalonate
71. di-(1-octyloxy-2,2,6,6-tetramethylpiperidin-4-yl) sebacate
72. di-(1-octyloxy-2,2,6,6-tetramethylpiperidin-4-yl) succinate
73. bis[N-(1-cyclohexyloxy-2,2,6,6-tetramethylpiperidin-4-yl)-n-butylamino] sebacamide
74. bis(1-cyclooctyloxy-2,2,6,6-tetramethylpiperidin-4-yl) sebacate
75. N,N',N'',N'''-tetrakis{2,4-bis[N-(1-cyclohexyloxy-2,2,6,6-tetramethylpiperidin-4-yl)-n-butylamino]1,3,5-triazin-6-yl}-3,3'-ethylenediiminodipropylamine
76. 2,4-bis[N-(1-cyclohexyloxy-2,2,6,6-tetramethylpiperidin-4-yl)-n-butylamino]-6-t-octylamino-1,3,5triazine 77. 2,4-bis[N-(1-cyclohexyloxy-2,2,6,6-tetramethylpiperidin-4-yl)-n-butylamino]-6-morpholino-1,3,5-triazine
78. N,N'-bis(1-cyclohexyloxy-2,2,6,6-tetramethylpiperidine-4-yl)-N,N'-bis{2,4-bis[N-(1-cyclohexyloxy-2,2,6,6'-tetramethyl-piperidin-4-yl)n-butylamino]1,3,5-triazin-6-yl}hexamethylenediamine
79. 2,4,6-tris[N-(1-cyclohexyloxy-2,2,6,6-tetramethylpiperidin-4-yl)-n-butylamino]-1,3,5-triazine
80. N-(1-cyclohexyloxy-2,2,6,6-tetramethylpiperidin-4-yl) succinimide
81. di-(1-hydroxy-2,2,6,6-tetramethylpiperidine-4-yl) methylmalonate
82. 1-hydroxy-4-salicyloxy-2,2,6,6-tetramethylpiperidine 83. di-(1-hydroxy-2,2,6,6-tetramethylpiperdine-4-yl) isophthalate
84. 1-hydroxy-2,2,6,6-tetramethylpiperidin-4-yl 3,5-di-tert-butyl-4-hydroxyhydrocinnamate
85. di(1-hydroxy-2,2,6,6-tetramethylpiperidin-4-yl) sebacate
86. di-(1-hydroxy-2,3,6-trimethyl-2,6-diethyl-piperidin-4-yl) phthalate
87. di-(1-hydroxy-2,2,6,6-tetramethylpiperidin-4-yl) n-butyl-(3,5-di-tert-butyl-4-hydroxybenzyl) malonate
88. hexane-1',6'-bis-(4-carbamoyloxy-1-hydroxy-2,2,6,6-tetramethylpiperidine)
89. N,N'-bis-(1-hydroxy-2,2,6,6-tetramethylpiperidin-4-yl)hexamethylene-1,6-diacetamide
90. 4-(N-cyclohexylacetamido)-1-hydroxy-2,2,6,6-tetramethylpiperidine
91. 1,6-di-(N-acetyl)-N-(1-hydroxy-2,2,6,6-tetramethyl-piperidine-4-yl)]aminohexane
92. N-(1-hydroxy-2,2,6,6-tetramethylpiperidin-4-yl)epsilon-caprolactam
93. N-(1-hydroxy-2,2,6,6-tetramethylpiperidin-4-yl)succinimide
94. N-(1-hydroxy-2,3,6-trimethyl-2,6-diethyl-piperidin-4-yl)-maleimide
95. 8-aza-2,7,7,9,9-pentamethyl-8-hydroxy-1,4-dioxyspiro[4.5]decane
96. 9-aza-3-hydroxymethyl-3-ethyl-9-hydroxy-8,8,10,10-tetramethyl-1,5-dioxaspiro[5.5]undecane
97. 3-n-octyl-1,3,8-triaza-8-hydroxy-7,7,9,9-tetramethyl-spiro[4.5]decan-2,4-dione
98. 8-hydroxy-2,7,7,9,9-pentamethyl-2-hexyl-1-oxa-3,8diazaspiro[4.5]decan-4-one
99. 3-hydroxy-2,2,4,4-tetramethyl-7-oxa-3,20-diazadispiro[5.1.11.2]heneicosan-21-one
100. 1,1'-ethylenebis-(4-hydroxy-3,3,5,5-tetramethylpiperazin-2-one)
101. 1,1'-sebacoyl-bis(3-hydroxy-2,2,4,4,6-pentamethylhexahydropyrimidine)
102. hydroxylamine derivative of polycondensation product of 2,4-dichloro-6-tert-octylamino-s-triazine and 4,4'-hexamethylenebis-(amino-2,2,6,6-tetramethylpiperidine)
103. N,N',N'',N'''-tetrakis[4,6-bis(butyl-(1-hydroxy-2,2,6,6-tetramethylpiperidin-4-yl)amino)-s-triazin-2-yl]1,10-diamino-4,7-diazadecane
104. hydroxylamine derivative of polycondensation product of 2,4-dichloro-6-morpholino-s-triazine and 4,4'-hexamethylenebis-(amino-2,2,6,6-tetramethylpiperidine)
105. 15-n-octadecyl-7-hydroxy-7,15-diazadispiro[5.1.5.3]hexadecane-14,16-dione
106. 4-benzoyloxy-1-hydroxy-2,2,6,6-tetramethylpiperidine
107. 3-hydroxy-2,2,4,4-tetramethyl-20-(2-lauryloxycarbonyl)ethyl-7-oxa-3,20-diazadispiro[5.1.11.2]heneicosan-21-one
108. di-(1-hydroxy-2,2,6,6,-tetramethylpiperidin-4-yl) phthalate
109. 1-hydroxy-2,2,6,6-tetramethylpiperidin-4-yl stearate
110. di-(1-hydroxy-2,2,6,6-tetramethylpiperidine-4-yl) terephthalate
111. 4-(4-tert.butylbenzoyloxy)-1-hydroxy-2,2,6,6-tetramethylpiperidine
112. (1-hydroxy-2,2,6,6-tetramethylpiperidin-4-yl)-4-hydroxy-3,5-di-tert.butylbenzoate
113. (1-hydroxy-2,2,6,6-tetramethylpiperidin-4-yl)-4-(4-hydroxy-3,5-di-tert.butylbenzoyloxy)-3,5-di-tert-.butylbenzoate
114. (1-hydroxy-2,2,6,6-tetramethylpiperidin-4-yl)-[4-(2-oxazepin-1-yl)-2,2,6,6-tetramethylpiperidin-4-yl) acetate
115. alpha,alpha'-di-(1-hydroxy-2,2,6,6-tetramethyl-piperidin-4-oxy)-p-xylene
116. di-(1-hydroxy-2,2,6,6-tetramethylpiperidin-4-yl) diethylmalonate
117. N-n-butyl-N-(1-hydroxy-2,2,6,6-tetramethylpiperidin-4-yl)-4-hydroxy-3,5-di-tert.butylbenzamide
118. tetrakis (1-hydroxy-2,2,6,6-tetramethyl-4-piperidyl)-1,2,3,4-butane-tetracarboxylate
119. di-(1-hydroxy-2,2,6,6-tetramethylpiperidin-4-yl)isophthalate
120. di-(1-hydroxy-2,2,6,6-tetramethylpiperidin-4-yl)n-butylmalonate
121. di-(1-hydroxy-2,2,6,6-tetramethylpiperidin-4-yl)-2-(4-hydroxy 3,5-di-t.-butylbenzyl)-n-butylmalonate The hydroxylamine derivatives of the instant invention are generally prepared by oxidizing the corresponding hindered amine with an appropriate peroxy compound such as hydrogen peroxide or tert-butyl hydroperoxide in the presence of a metal carbonyl or metal oxide catalyst followed by reduction of the oxyl intermediate formed to the desired N-hydroxy derivative, preferably by catalytic hydrogenation. Thereafter, the N-acyloxy derivatives are prepared by reacting the N-hydroxy hindered amine with the appropriate acid chloride, anhydride, isocyanate or substituted chloroformate. The catalytic hydrogenation can also be conducted in acetic anhydride to prepare the N-acetoxy derivative.

O-alkyl substituted N-hydroxy derivatives can be synthesized by several routes. The N-hydroxy derivative can be alkylated with sodium hydride and halogenated hydrocarbons such as benzyl bromide and ethyl iodide. N-methoxy variants can be prepared by thermolysis of a chlorobenzene solution of nitroxyl radical and di-tert-butyl peroxide. The product is formed by a coupling reaction between the nitroxyl radical and methyl radical generated from β-scission of a t-butoxy radical. Other N-alkoxy variants are synthesized by coupling nitroxyl radicals with hydrocarbon radicals generated from thermal decomposition of di-tert-butyl peroxide in the presence of hydrocarbon solvents such as cyclohexane, toluene, and ethylbenzene.

A preferred approach is the preparation of N-alkoxy hindered amines directly from hindered amines. For example, a mixture of 4-benzoyloxy-2,2,6,6-tetramethylpiperidine, aqueous t-butyl hydroperoxide, molybdenum oxide, and ethylbenzene gives a 90% yield of N-alpha-methylbenzyloxy HALS.

The oxalates of formula N can be prepared by reacting (1-hydroxy-2,2,6,6-tetramethylpiperidin-4-yl)stearate, benzoate, and the like, with oxalylchloride, or for $G_1$ being —NH—G'—NH by reacting the appropriate 1-hydroxy-2,2,6,6-tetramethylpiperidine with the appropriate diisocyanate.

The hindered amine precursors are largely commercially available or can be prepared by known methods.

The stabilizer system according to the invention is suitable for stabilizing those organic polymers which contain hetero atoms, double bonds or aromatic rings. The following are examples thereof:

1. polymers derived from doubly unsaturated hydrocarbons, e.g. polyisoprene or polybutadiene;
2. polystyrene;
3. copolymers of styrene or alpha-methyl styrene with dienes or acryl derivatives, such as styrene-butadiene, styrene-acrylonitrile, styrene-acrylonitrile-methacrylate, mixtures of high impact strength from styrene-copolymers and another polymer, such as polyacrylate, a diene-polymer or an ethylene-propylene-diene terpolymer, as well as block copolymers of styrene such as styrene-butadiene-styrene, styrene-isoprene-styrene or styrene-ethylene/butylenestyrene;

4. graft polymers of styrene, such as styrene or polybutadiene, styrene and acrylonitrile on polybutadiene, as well as mixtures with the copolymers mentioned under (3), such as those known as ABS polymers;

5. halogen-containing vinyl polymers, such as polyvinyl chloride, polyvinylidene cloride, polyvinyl fluoride, polychloroprene, chlorinated rubber, vinyl chloride/vinylidene chloride copolymers, vinyl chloride/vinyl acetate copolymers or vinylidene chloride/vinyl acetate copolymers, and alloys of polyvinyl halides with polymers mentioned under (3), specifically acrylonitrile/ethylenepropylene-diene monomer/styrene andacrylonitrile/styrene/butyl acrylate.

6. polymers derived from alpha,beta-unsaturated acids and derivatives thereof, polyacrylates and polymethacrylates, polymethylmethacrylate, polyacrylic amides and polyacrylonitrile;

7. polymers derived from unsaturated alcohols or their acyl derivatives or acetals, such as polyvinyl alcohol, polyvinyl acetate, polyvinyl stearate, polyvinyl benzoate, polyvinyl butyral, polyallyl phthalate, polyallyl melamine and copolymers thereof with other vinyl compounds, such as ethylene/vinyl acetate copolymers;

8. polyacetals such as polyoxymethylene, and also those polyoxymethylenes containing as comonomers, e.g. ethylene oxide;

9. polyurethanes;

10. polycarbonates;

11. aliphatic and aromatic polyamides and copolyamides derived from diamines and dicarboxylic acids and/or from aminocarboxylic acids or the corresponding lactams, such as polyamide 6, polyamide 6/6, polyamide 6/10, polyamide 11 and polyamide 12;

12. polyesters derived from dicarboxylic acids and dialcohols and/or from hydroxycarboxylic acids or corresponding lactones, such as polyethylene glycol terephthalate and poly-1,4-dimethylol-cyclohexaneterephthalate.

Substrates of particular interest are polyvinyl chloride, particularly pigmented rigid polyvinyl chloride, polyurethanes, styrenic polymers such as ABS polymers and polyvinyl chloride alloys.

In general, the compounds of the present invention are employed in from about 0.01 to about 5% by weight of the stabilized composition, although this will vary with the particular substrate and application. An advantageous range is from about 0.05 to about 2%, and especially 0.1 to about 1%.

The stabilizers of the instant invention may readily be incorporated into the indicated polymeric substrates by conventional techniques, at any convenient state prior to the manufacture of shaped articles therefrom. For example, the stabilizer may be mixed with the polymer in dry powder form, or a suspension or emulsion of the stabilizer may be mixed with a solution, suspension, or emulsion of the polymer. The resulting stabilized polymer compositions of the invention may optionally also contain various conventional additives, such as the following.

1. Antioxidants
1.1. Alkylated monophenols, for example
2,6-di-tert.butyl-4-methylphenol
2-tert.butyl-4,6-dimethylphenol
2,6-di-tert.butyl-4-ethylphenol
2,6-di-tert.butyl-4-n-butylphenol
2,6-di-tert.butyl-4-i-butylphenol
2,6-di-cyclopentyl-4-methylphenol
2-(α-methylcyclohexyl)-4,6-dimethylphenol
2,6-di-octadecyl-4-methylphenol
2,4,6-tri-cyclohexylphenol 2,6-di-tert.butyl-4-methoxymethylphenol
1.2. Alkylated hydroquinones, for example
2,6-di-tert.butyl-4-methoxyphenol
2,5-di-tert.butyl-hydroquinone
2,5-di-tert.amyl-hydroquinone
2,6-diphenyl-4-octadecyloxyphenol
1.3. Hydroxylated thiodiphenyl ethers, for example
2,2'-thio-bis-(6-tert.butyl-4-methylphenol)
2,2'-thio-bis-(4-octylphenol)
4,4'-thio-bis-(6-tert.butyl-3-methylphenol)
4,4'-thio-bis-(6-tert.butyl-2-methylphenol)
1.4. Alkylidene-bisphenols, for example
2,2'-methylene-bis-(6-tert.butyl-4-methylphenol)
2,2'-methylene-bis-(6-tert.butyl-4-ethylphenol)
2,2'-methylene-bis-[4-methyl-6-(α-methylcyclohexyl)-phenol]
2,2'-methylene-bis-(4-methyl-6-cyclohexylphenol)
2,2'-methylene-bis-(6-nonyl-4-methylphenol)
2,2'-methylene-bis-[6-(α-methylbenzyl)-4-nonylphenol]
2,2'-methylene-bis-[6-(α,α-dimethylbenzyl)-4-nonylphenol]
2,2'-methylene-bis-(4,6-di-tert.butylphenol)
2,2'-ethylidene-bis-(4,6-di-tert.butylphenol)
2,2'-ethylidene-bis-(6-tert.butyl-4-isobutylphenol)
4,4'-methylene-bis-(2,6-di-tert.butylphenol)
4,4'-methylene-bis-(6-tert.butyl-2-methylphenol)
1,1-bis-(5-tert.butyl-4-hydroxy-2-methylphenyl-butane
2,6-di-(3-tert.butyl-5-methyl-2-hydroxybenzyl)-4-methylphenol
1,1,3-tris-(5-tert.butyl-4-hydroxy-2-methylphenyl)-butane
1,1-bis-(5-tert.butyl-4-hydroxy-2-methylphenyl)-3-n-dodecylmercaptobutane ethylenglycol-bis-[3,3-bis-(3'-tert.butyl-4'-hydroxyphenyl)-butyrate]
di-(3-tert.butyl-4-hydroxy-5-methylphenyl)-dicyclopentadiene
di-[2-(3'-tert.butyl-2'-hydroxy-5'-methyl-benzyl)-6-tert.butyl-4-methylphenyl]-terephthalate.
1.5. Benzyl compounds, for example
1,3,5-tri-(3,5-di-tert.butyl-4-hydroxybenzyl)-2,4,6-trimethylbenzene-di-(3,5-di-tert.butyl-4-hydroxybenzyl)sulfide
3,5-di-tert.butyl-4-hydroxybenzyl-mercapto-acetic acid isooctyl ester
bis-(4-tert.butyl-3-hydroxy-2,6-dimethylbenzyl)dithiol-terephthalate
1,3,5-tris-(3,5-di-tert.butyl-4-hydroxybenzyl)-isocyanurate
1,3,5-tris-(4-tert.butyl-3-hydroxy-2,6-dimethylbenzyl)isocyanurate
3,5-di-tert.butyl-4-hydroxybenzyl-phosphoric acid-dioctadecyl ester
3,5-di-tert.butyl-4-hydroxybenzyl-phosphoric acid-monoethyl ester, calcium-salt
1.6. Acylaminophenols, for example
4-hydroxy-lauric acid anilide
4-hydroxy-stearic acid anilide
2,4-bis-octylmercapto-6-(3,5-tert.butyl-4-hydroxyanilino)s-triazine octyl-N-(3,5-di-tert.butyl-4-hydroxyphenyl)-carbamate 1.7. Esters of β-(3,5-di-tert-butyl-4-hydroxyphenyl)-propionic acid with monohydric or polyhydric alcohols, for example

| | |
|---|---|
| methanol | diethyleneglycol |
| octadecanol | triethyleneglycol |
| 1,6-hexanediol | pentaerythritol |
| neopentylglycol | tris-hydroxyethyl isocyanurate |
| thiodiethyleneglycol | di-hydroxyethyl oxalic acid diamide |

1.8. Esters of β-(5-tert-butyl-4-hydroxy-3-methylphenyl)propionic acid with monohydric or polyhydric alcohols, for example

| | |
|---|---|
| methanol | diethyleneglycol |
| octadecanol | triethyleneglycol |
| 1,6-hexanediol | pentaerythritol |
| neopentylglycol | tris-hydroxyethyl isocyanurate |
| thiodiethyleneglycol | di-hydroxyethyl oxalic acid diamide |

2 1.9. Amides of β-(3,5-di-tert.butyl-4-hydroxyphenyl)propionic acid for example
N,N'-di-(3,5-di-tert.butyl-4-hydroxyphenylpropionyl)-hexamethylenediamine
N,N'-di-(3,5-di-tert.butyl-4-hydroxyphenylpropionyl)-trimethylenediamine
N,N'-di-(3,5-di-tert.butyl-4-hydroxyphenylpropionyl)-hydrazine 2. UV absorbers and light stabilizers 2.1. 2-(2'-Hydroxyphenyl)-benzotriazoles, for example, the 5'-methyl-, 3',5'-di-tert.butyl-, 5'-tert.butyl-, 5'-(1,1,3,3-tetramethylbutyl)-, 5-chloro-3',5'-di-tert.butyl-, 5-chloro-3'-tert.butyl-5'-methyl-, 3'-sec.butyl-5'-tert.butyl-, 4'-octoxy, 3',5'-di-tert.amyl-, 3',5'-bis(α,α-dimethylbenzyl)-derivative.

2.2. 2-Hydroxy-benzophenones, for example, the 4-hydroxy-, 4-methoxy-, 4-octoxy, 4-decyloxy-, 4-dodecyloxy-, 4-benzyloxy, 4,2',4'-trihydroxy- and 2'-hydroxy-4,4'-dimethoxy derivative.

2.3. Esters of optionally substituted benzoic acids for example, phenyl salicylate, 4-tert.butyl-phenylsalicylate, octylphenyl salicylate, dibenzoylresorcinol, bis-(4-tert.butylbenzoyl)-resorcinol, benzoylresorcinol, 3,5-di-tert.butyl-4-hydroxybenzoic acid 2,4-di-tert.butyl-phenyl ester and 3,5-di-tert.-butyl-4-hydroxybenzoic acid hexadecyl ester.

2.4. Acrylates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline.

2.5 Nickel compounds, for example, nickel complexes of 2,2'-thio-bis-[4-(1,1,3,3-tetramethylbutyl)-phenol], such as the 1:1 or 1:2 complex, optionally with additional ligands such as n-butylamine, triethanolamine or N-cyclohexyl-di-ethanolamine, nickel dibutyldithiocarbamate, nickel salts of 4-hydroxy-3,5-di-tert.butylbenzylphosphonic acid monoalkyl esters, such as of the methyl, ethyl or butyl ester, nickel complexes of ketoximes such as of 2-hydroxy-4-methyl-phenyl undecyl ketoxime, nickel complexes of 1-phenyl-4-lauroyl-5-hydroxy-pyrazol, optionally with additional ligands.

2.6. Sterically hindered amines, for example bis-(2,2,6,6-tetramethylpiperidyl)-sebacate bis-(1,2,2,6,6-pentamethylpiperidyl)-sebacate n-butyl-3,5-di-tert.butyl-4-hydroxybenzyl malonic acid bis-(1,2,2,6,6-pentamethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylendiamine and 4-tert.octylamino-2,6-dichloro-1,3,5-s-triazine, tris(2,2,6,6-tetramethylpiperidyl)-nitrilotriacetate, tetrakis-(2,2,6,6-tetramethyl-4-piperidyl)-1,2,3,4-butanetetracarbonic acid, 1,1'(1,2-ethanediyl)-bis-(3,3,5,5tetramethylpiperazinone).

2.7. Oxalic acid diamides, for example, 4,4'-dioctyloxyoxanilide, 2,2'-di-octyloxy-5,5'-di-tert.butyloxanilide, 2,2'-di-dodecyloxy-5,5'-di-tert.butyl-oxanilide, 2-ethoxy-2'-ethyl-oxanilide, N,N'-bis (3-dimethylaminopropyl)oxalamide, 2-ethoxy-5-tert.butyl-2'-ethyloxanilide and its mixture with 2-ethoxy-2'-ethyl-5,4'-di-tert.butyloxanilide and mixtures of ortho- and para-methoxy-as well as of o- and p-ethoxy-disubstituted oxanilides.

3. Metal deactivators, for example, N,N'-diphenyloxalic acid diamide, N-salicylal-N'-salicyloylhydrazine, N,N'-bis-salicyloylhydrazine, N,N'-bis-(3,5-di-tert.butyl-4-hydroxyphenylpropionyl)-hydrazine, 3-salicyloylamino-1,2,4-triazole, bis-benzylidene-oxalic acid dihydrazide.

4. Phosphites and phosphonites, for example, triphenyl phosphite, diphenylalkyl phosphites, phenyldialkyl phosphites, tri-(nonylphenyl)phosphite, trilauryl phosphite, trioctadecyl phosphite, di-stearyl-pentaerythritol diphosphite, tris-(2,4-di-tert.butylphenyl) phosphite, di-isodecylpentaerythritol diphosphite, di-(2,4-di-tert.butylphenyl)pentaerythritol diphosphite, tristearylsorbitol triphosphite, tetrakis-(2,4-di-tert butylphenyl)4,4'-diphenylylenediphosphonite.

5. Compounds which destroy peroxide, for example, esters o β-thiodipropionic acid, for example the lauryl, stearyl, myristyl or tridecyl esters, mercapto-benzimidazole or the zinc salt of 2-mercaptobenzimidazole, zinc-dibutyl-dithiocarbamate, dioctadecyldisulfide, pentaerythritol-tetrakis(β-dodecylmercapto)-propionate.

6. Polyamide stabilizers, for example copper salts in combination with iodides and/or phosphorus compounds and salts of divalent manganese.

7. Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg stearate, Na ricinoleate and K palmitate, antimony pyrocatecholate or zinc pyrocatecholate.

8. Hydroxylamine co-stabilizers, for example, dibenzyl hydroxylamine, dioctyl hydroxylamine, didodecyl hydroxylamine and dioctadecyl hydroxylamine.

9. Nucleating agents, for example, 4-tert butyl-benzoic acid, adipic acid, diphenylacetic acid.

10. Fillers and reinforcing agents, for example, calcium carbonate, silicates, glass fibers, asbestos, talc, kaolin, mica, barium sulfate, metal oxides and hydroxides, carbon black, graphite.

11. Other additives, for example, plasticizers, lubricants, emulsifiers, pigments, optical brighteners, flameproofing agents, anti-static agents, blowing agents and thiosynergists such as dilaurylthiodipropionate or distearylthiodipropionate.

Of particular value in the instant compositions are the benzotriazoles of high molecular weight and low volatility such as 2-[2-hydroxy-3,5-di(alpha,alpha-dimethylbenzyl)-phenyl]-2H-benzotriazole, 2-(2-hydroxy-3,5-di-tert-octylphenyl)-2H-benzotriazole, 2-(2-hydroxy-3-alpha,alpha-dimethylbenzyl-5-tert-octyl-phenyl)-2H-benzotriazole, 2-(2-hydroxy-3-tert-octyl-5-alpha,alpha-dimethylbenzylphenyl)-2H-benzotriazole, 2-(2-hydroxy-3,5-di-tertamylphenyl)-2H-benzotriazole, 2-[2-hydroxy-3-tert-butyl-5-(2-(omega-hydroxy-octa-(ethyleneoxy)carbonyl)-ethylphenyl]2H-benzotriazole, dodecylated 2-(2-hydroxy-5-methylphenyl)2H-benzotriazole and the 5-chloro compounds corresponding to each of the above named benzotriazoles.

Most preferably the benzotriazoles useful in the instant compositions are 2-[2-hydroxy-3,5-di(alpha,alphadimethyl-benzyl)phenyl]-2H-benzotriazole and 2-[2-hydroxy-3-tert-butyl-5-(2-(omega-hydroxy-octa-(ethyleneoxy)carbonyl)-ethylphenyl]-2H-benzotriazole.

Of particular interest in connection with the stabilization of polyvinyl halides are formulations containing (1) a polyvinyl halide, (2) a thermal stabilizer and (3) a NOR$_1$ hindered amine derivative of the instant invention, preferably a NOR$_1$ derivative without R$_1$ acyl groups. Thermal stabilizers are generally known. Included among such derivatives are organotin carboxylate compounds characterized by having an oxygen atom bonded directly to the tin atom. Such compounds may be identified as carboxylates or alcoholates containing Sn—ORad, Sn—OOCRad, RadCOO—S-n—O—Sn—OOCRad or Sn—OOCCH=CHCOORad groups wherein "Rad" defines a series of alkyl, cycloalkyl, aryl or aralkyl substituents. Other organotins include organotin mercaptoesters and organotin mercaptides, the former containing groups of Sn—[S(CH$_2$)$_n$—COORad] while the latter correspond to the general formula (RadS)—Sn—Rad.

Other categories of thermal stabilizers are barium/cadmium, barium/zinc, calcium/zinc, antimony and lead compounds, including salts of fatty acids.

These formulations can contain optional ingredients such as titanium dioxide, other pigments, fillers, plasticizers, and the like, as well as the UV absorbers and antioxidants noted hereinabove.

The following examples further illustrate the embodiments of the instant invention. All parts given are by weight unless otherwise noted.

EXAMPLE 1

This example illustrates the performance of the instant compounds in polyvinyl chloride formulations. In particular, it illustrates the manner in which the instant compounds minimize the detrimental effect on thermal stability during processing of such formulations, which detrimental effect is encountered with conventional hindered amine light stabilizers.

The following rigid polyvinyl chloride formulations are prepared.

| | Parts | | | |
|---|---|---|---|---|
| | A | B | C | D |
| polyvinyl chloride resin[1] | 100.0 | 100.0 | 100.0 | 100.0 |
| tin mercaptide[2] | 1.5 | — | 2.0 | — |
| tin carboxylate[3] | — | 2.5 | — | 2.0 |
| methacrylic acid/ester processing aid[4] | 1.5 | 1.5 | 2.0 | 2.0 |
| acrylic impact modifier[5] | 6.0 | 6.0 | 7.0 | 7.0 |
| paraffin wax | 1.0 | 0.3 | 1.0 | 1.0 |

-continued

| | Parts | | | |
|---|---|---|---|---|
| | A | B | C | D |
| polyethylene wax | 0.1 | 0.1 | 0.2 | 0.2 |
| calcium stearate | 1.0 | — | 0.8 | — |
| titanium dioxide | — | — | 5.0 | 5.0 |
| brown pigment[6] | 0.9 | 0.9 | — | — |
| pigment[7] | 0.1 | 0.1 | — | — |

[1]GEON 103EP-76 from B. F. Goodrich Co.
[2]THERMOLITE T-137 from M&T Chemicals
[3]IRGASTAB T-634 from CIBA-GEIGY Corp.
[4]ACRYLOID K120N from Rohm and Haas
[5]ACRYLOID K323B from Rohm and Haas
[6]CROMOPHTAL BROWN 5R from CIBA-GEIGY Corp.
[7]MONARCH X-3228 from CIBA-GEIGY Corp.

The ingredients are blended together with one part per hundred of the indicated derivative. Thereafter, (I) 60 gram samples are tested in a Brabender Plasti-Corder at 190° C. Changes in torque are measured over time. Longer times to degradation are indicative of reduced detrimental effects of the light stabilizer on the thermal stability of the PVC during processing.

(II) Samples are also milled on a two roll mill (front roll @171° C. - back roll @165° C.) for a period of three minutes after band formation. The resulting material is then compression molded (temperature 182° C., 2 minutes contactpressure, 1 minute pumping pressure, 2 minutes full pressure, cool to 38° C.) and cut into test plaques (5.1 cm.×5.1 cm.). The plaques are exposed in a Xenon Arc Weatherometer at black panel temperature of 60°–66° C. and relative humidity of 25–35%. Samples are withdrawn at periodic intervals and yellowness index and/or ΔE values measured according to ASTM D-1925-63T utilizing an Applied Color Systems Spectro-Sensor II Colorimeter. Higher values are indicative of less stability.

The results obtained in these tests are noted in the following tables.

TABLE 1

| | (Test I) | |
|---|---|---|
| | Degradation Time (Min.) | |
| Stabilizer | PVC-A | PVC-B |
| — | 29.0 | 24.5 |
| A | 14.5 | 14.0 |
| 40 | 23.0 | 24.5 |
| 43 | 26.0 | 23.5 |
| 53 | 30.0 | 23.5 |
| 54 | 26.5 | 25.5 |
| 69 | 26.0 | 23.5 |
| — | 30.0 | 24.0 |
| 46 | 27.0 | 21.5 |
| — | 24.0 | 20.0 |
| 40 | 25.0 | 23.5 |
| 45 | 19.0 | 23.0 |
| 47 | 18.5 | 23.0 |
| 48 | 15.0 | 19.5 |
| — | 26.2 | 21.1 |
| A | 14.5 | 15.7 |
| B | 10.8 | 10.5 |
| 76 | 22.0 | 18.3 |
| 77 | 28.8 | 21.5 |
| 79 | 28.0 | 20.0 |

A — bis(2,2,6,6-tetramethylpiperidin-4-yl)sebacate
B — poly{[6-[(morpholino)-imino]-1,3,5-triazine-2,4-diyl][2-(2,2,6,6-tetramethylpiperidyl)-imino]-hexamethylene-4-[4-(2,2,6,6-tetramethylpiperidyl)-imino]}

It is thus seen that the compounds substantially maintain the thermal stability of the PVC formulations.

EXAMPLE 2

This example illustrates the stabilization performance of the instant derivatives utilizing test procedure II in Example 1 and determining the ΔE value utilizing the FMC II calculation method and based on calculations initially and after 3014 hours.

| Stabilizer | PVC Form | ΔE |
|---|---|---|
| — | B | 6.7 |
| 45 | B | 2.8 |
| 46 | B | 1.1 |
| 47 | B | 0.6 |
| 48 | B | 4.7 |
| 67* | B | 5.0 |
|  |  | 3014 |
| — | C | 15.8 |
| 40 | C | 12.1 |
| 46 | C | 8.3 |
| 47 | C | 14.4 |
| 48 | C | 11.2 |
| — | D | 10.8 |
| 47 | D | 9.9 |
| 48 | D | 10.6 |
| 49 | D | 4.5 |

*1-cyclohexyloxy variation

These data thus indicate the stability impact of these compounds in PVC formulations.

EXAMPLE 3

This example illustrates the stabilization performance of the instant compounds in polyurethane formulations.

The polyurethane to be utilized is formed from the reaction of a modified methylene diisocyanate (ISONATE 143L from Dow Chemical), a polyether-based polyol (VORANOL 4701 from Dow Chemical) and 1,4-butanediol. The reaction catalyst is dibutyltin dilaurate at 40 ppm to allow for reasonable pour time of 30 seconds at ambient temperature after mixing. The additives are predissolved in 5 grams of the blended polyol mixture. Polyurethane plaques are prepared as noted above and are exposed in a Dry Xenon Arc Weatherometer for up to 300 hours and monitored for color generation (YI) and 60° gloss retention.

| Stabilizers | Conc. (% by wt.) | YI at hrs. | | | | 60° Gloss at hours | | |
|---|---|---|---|---|---|---|---|---|
|  |  | 0 | 50 | 100 | 300 | 0 | 50 | 100 |
| — | — | 10 | 46 | 63 | 70 | 106 | 75 | 10 |
| C/D/38 | 0.2/0.4/0.4 | 11 | 26 | 44 | 55 | 93 | 93 | 14 |
| C/D/46 | 0.2/0.4/0.4 | 11 | 24 | 41 | 54 | 96 | 90 | 37 |
| C/D/52 | 0.2/0.4/0.4 | 11 | 24 | 39 | 49 | 90 | 84 | 35 |
| C/D/53 | 0.2/0.4/0.4 | 10 | 23 | 38 | 48 | 88 | 86 | 47 |
| C/D/54 | 0.2/0.4/0.4 | 10 | 25 | 43 | 55 | 95 | 95 | 22 |
| C/D/55 | 0.2/0.4/0.4 | — | — | — | 51 | — | — | — |
| C/D/70 | 0.2/0.4/0.4 | 10 | 24 | 41 | 54 | 87 | 86 | 17 |
| C/D/49 | 0.2/0.4/0.4 | 11 | 24 | 40 | 52 | 97 | 90 | 31 |
| C/D/A | 0.2/0.4/0.4 | — | — | — | 47 | — | — | — |

Stabilizer C - triethylene glycol bis(3-methyl-5-tert.butyl-4 hydroxyphenyl) propionate
Stabilizer D - 2-[3',5'-di-(1,1-dimethylpropyl)-2'-hydroxy-phenyl]-5-benzotriazole

EXAMPLE 4

This example illustrates the stabilization performance of the instant compounds in acrylonitrile/butadiene/styrene polymer.

The ABS polymer (DOW 342EZ) is blended with 4% by weight, TiO$_2$-containing pigment and with the indicated amounts of stabilizer, compounded on a two roll mill at 150° C./163° C. for five minutes and compression molded at 218° C. to form 5 cm × 5 cm × 0.2 cm test plaques. The plaques are then exposed in the Interior Automotive Xenon Arc Weatherometer at 89° C. and 100% relative humidity in the dark cycle. Yellowness Index values and ΔE values are determined originally and after 400 hours exposure.

| Stabilizer | Conc. (% by wt.) | YI (ΔE) after hours | |
|---|---|---|---|
|  |  | 0 | 400 |
| — | — | 14 | 43 (15.1) |
| 46 | 1.0 | 14 | 28 (7.3) |
| D/46 | 0.5/0.5 | 14 | 27 (6.4) |
| 47 | 1.0 | 14 | 30 (8.5) |
| D/47 | 0.5/0.5 | 14 | 29 (8.0) |
| 54 | 1.0 | 14 | 25 (6.0) |
| D/54 | 0.5/0.5 | 14 | 27 (6.7) |
| 71 | 1.0 | 14 | 26 (6.9) |
| D/71 | 0.5/0.5 | 14 | 27 (7.0) |

These data further indicate the improved performance characteristics of the instant systems.

EXAMPLE 5

This examples illustrates the stabilization performance of the instant compounds in various polyvinyl chloride alloys.

In each instance the PVC alloy is blended with the indicated amounts of stabilizer system and processed according to the general procedure of Example 4. ΔE values are determined as in Example 2 based on calculations initially and after 2500 hours in the first series of data and after 3500 hours in the second series of data. In addition, equivalent plaques are exposed outdoors in an Arizona climate, with the unexposed samples and samples exposed for six months being subjected to a drop weight impact test procedure for determination of impact retention.

| | Series 1 (AES/PVC*) | | |
|---|---|---|---|
| Stabilizer | Conc. (% by wt.) | ΔE | % Impact Retention |
| — | — | 7.0 | 61 |
| B/D** | 0.3/0.7 | 1.3 | 75 |
| 46/D** | 0.5/0.5 | 1.6 | 88 |

*Acrylonitrile/EPDM/Styrene-PVC (ROVEL from Dow) containing tin mercaptide heat stabilizer (#2) in PVC
**Same alloy as * except contains equivalent amount of tin carboxylate (#3) in PVC

| | Series 2 (ASA/PVC*) | | |
|---|---|---|---|
| Stabilizer | Conc. (% by wt.) | ΔE | % Impact Retention |
| — | — | 4.8 | 68 |
| B/D** | 0.5/0.5 | 2.2 | 99 |
| 46/D** | 0.5/0.5 | 2.8 | 93 |

*Acrylonitrile/Styrene/Butyl Acrylate-PVC (GELOY from GE Corp.) containing tin mercaptide heat stabilizer (#2) in PVC
**Same alloy as * except contains equivalent amount of tin carboxylate (#3) in PVC

EXAMPLE 6

This example illustrates the stabilization performance of the instant compounds in polymethylmethacrylate.

In this instance, the stabilizer is added prior to the polymerization reaction of the polymethylmethacrylate. Sheets are cast from the polymer and evaluated as to Yellowness Index and spectrophotographic transmission. In addition, the liquid polymer is evaluated as to relative viscosity. Values are obtained on the initial samples and on the samples after 2000 hour exposure.

| Stabilizer | YI 0 | YI 2000 | Rel. Visc. (0.2%/25° C.) 0 | Rel. Visc. (0.2%/25° C.) 2000 | % Trans. (300 nm) 0 | % Trans. (300 nm) 2000 |
|---|---|---|---|---|---|---|
| — | 2.2 | 2.5 | 2.61 | 1.16 | 75 | 82 |
| A | 2.8 | 1.7 | 2.73 | 1.36 | 71 | 89 |
| 46 | 2.1 | 1.5 | 2.38 | 1.34 | 75 | 90 |
| 54 | 2.1 | 1.5 | 2.74 | 1.36 | 75 | 90 |
| 71 | 2.0 | 1.7 | 2.62 | 1.34 | 78 | 89 |

What is claimed is:

1. A stabilized composition comprising
   (a) an organic polymer containing hetero atoms, double bonds or aromatic rings and
   (b) an effective stabilizing amount of a substituted hindered amine derivative containing the group

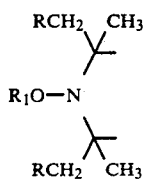

wherein R is hydrogen or methyl, and $R_1$ is hydrogen, $C_1$-$C_{18}$ alkyl, $C_2$-$C_{18}$ alkenyl, $C_2$-$C_{18}$ alkynyl, $C_5$-$C_{12}$ cycloalkyl, $C_6$-$C_{10}$ bicycloalkyl, $C_5$-$C_8$ cycloalkenyl, $C_6$-$C_{10}$ aryl, $C_7$-$C_9$ aralkyl, $C_7$-$C_9$ aralkyl substituted by alkyl or aryl, or

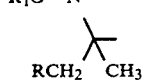

wherein D is $C_1$-$C_{18}$ alkyl, $C_1$-$C_{18}$ alkoxy, phenyl, pheny substituted by hydroxy, alkyl or alkoxy, or amino or amino mono- or disubstituted by alkyl or phenyl.

2. The composition according to claim 1, which contains as component (b) a hindered amine derivative corresponding to the formulae A-P -continued

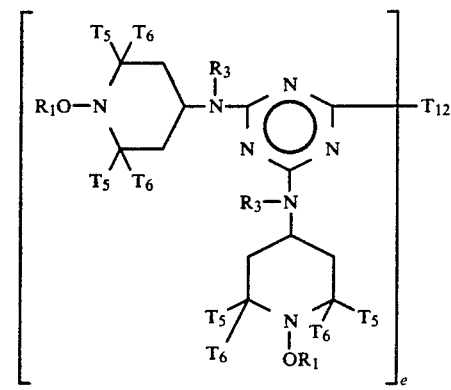
(K)

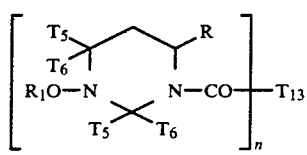
(L)

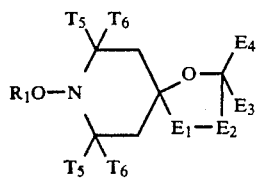
(M)

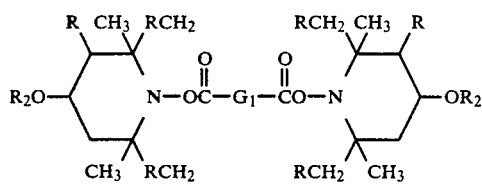
(N)

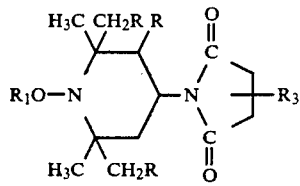
(O)

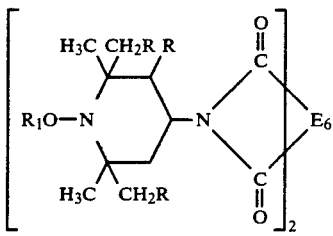
(P)

wherein
R is hydrogen or methyl,
$R_1$ is independently hydrogen, $C_1$–$C_{18}$ alkyl, $C_2$–$C_{19}$ alkenyl, $C_2$–$C_{18}$ alkynyl, $C_5$–$C_{12}$ cycloalkyl, $C_6$–$C_{10}$ bicycloalkyl, $C_5$–$C_8$ cycloalkenyl, $C_6$–$C_{10}$ aryl, $C_7$–$C_9$ aralkyl, $C_7$–$C_9$ aralkyl substituted by alkyl or aryl, or

wherein D is $C_1$–$C_{18}$ alkyl, $C_1$–$C_{18}$ alkoxy, phenyl, phenyl substituted by hydroxy, alkyl or alkoxy, or amino or amino mono- or disubstituted by alkyl or phenyl;

m is 1-4, when m is 1, $R_2$ is hydrogen, $C_1$–$C_{18}$ alkyl optionally interrupted by one or more oxygen atoms, $C_2$–$C_{12}$ alkenyl, $C_6$–$C_{10}$ aryl, $C_7$–$C_{18}$ aralkyl, glycidyl, a monovalent acyl radical of an aliphatic, cycloaliphatic, araliphatic or aromatic carboxylic acid, or of a carbamic acid

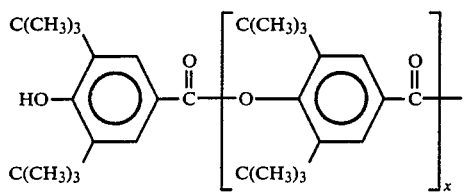

wherein x is 0 or 1, or

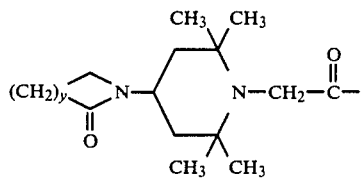

wherein y is 2-4;

when m is 2, $R_2$ is $C_1$–$C_{12}$ alkylene, $C_4$–$C_{12}$ alkenylene, xylylene, a divalent acyl radical of an aliphatic, cycloaliphatic, araliphatic or aromatic dicarboxylic acid or of a dicarbamic acid, when m is 3, $R_2$ is a trivalent acyl radical of an aliphatic, unsaturated aliphatic, cycloaliphatic, or aromatic tricarboxylic acid;

when m is 4, $R_2$ is a tetravalent acyl radical of a saturated or unsaturated aliphatic or aromatic tetracarboxylic acid;

p is 1, 2 or 3, $R_3$ is hydrogen, $C_1$–$C_{12}$ alkyl, $C_5$–$C_7$ cycloalkyl, $C_7$–$C_9$ aralkyl, $C_2$–$C_{18}$ alkanoyl, $C_3$–$C_5$ alkenoyl or benzoyl;

when p is 1, $R_4$ is hydrogen, $C_1$–$C_{18}$ alkyl, $C_5$–$C_7$ cycloalkyl, $C_2$–$C_8$ alkenyl unsubstituted or substituted by a cyano, carbonyl or carbamide group, aryl, aralkyl, or it is glycidyl, a group of the formula —$CH_2$—CH(OH)—Z or of the formula —CONH—Z wherein Z is hydrogen, methyl or phenyl; or a group of the formulae

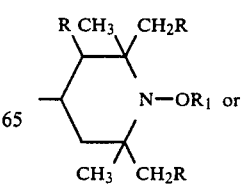

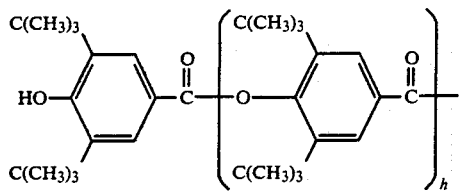

with h as 0 or 1;

or $R_3$ and $R_4$ together when p is 1 can be alkylene of 4 to 6 carbon atoms or 2-oxapolyalkylene or the cyclic acyl radical of an aliphatic or aromatic 1,2- or 1,3-dicarboxylic acid, when p is 2, $R_4$ is a direct bond or is $C_1-C_{12}$ alkylene, $C_6-C_{12}$ arylene, xylylene, a —$CH_2CH(OH)$—$CH_2$ group, or a group —$CH_2$—$CH(OH)$—$CH_2$—O—X—O—$CH_2$—$CH(OH)$—$CH_2$— wherein X is $C_2-C_{10}$ alkylene, $C_6-C_{15}$ arylene or $C_6-C_{12}$ cycloalkylene; or, provided that $R_3$ is not alkanoyl, alkenoyl or benzoyl, $R_4$ can also be a divalent acyl radical of an aliphatic, cycloaliphatic or aromatic dicarboxylic acid or dicarbamic acid, or can be the group —CO—; or $R_4$ is

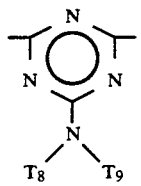

where $T_8$ and $T_9$ are independently hydrogen, alkyl of 1 to 18 carbon atoms, or $T_8$ and $T_9$ together are alkylene of 4 to 6 carbon atoms or 3-oxapentamethylene;

when p is 3, $R_4$ is 2,4,6-triazinyl, n is 1 or 2, when n is 1, $R_5$ and $R'_5$ are independently $C_1-C_{12}$ alkyl, $C_2-C_{12}$ alkenyl, $C_7-C_{12}$ aralkyl, or $R_5$ is also hydrogen, or $R_5$ and $R'_5$ together are $C_2-C_8$ alkylene or hydroxyalkylene or $C_4-C_{22}$ acyloxyalkylene;

when n is 2, $R_5$ and $R'_5$ together are (—$CH_2$)$_2C$(—$CH_2$—)$_2$;

$R_6$ is hydrogen, $C_1-C_{12}$ alkyl, allyl, benzyl, glycidyl or $C_2-C_6$ alkoxyalkyl;

when n is 1, $R_7$ is hydrogen, $C_1-C_{12}$ alkyl, $C_3-C_5$ alkenyl, $C_7-C_9$ aralkyl, $C_5-C_7$ cycloalkyl, $C_2-C_4$ hydroxyalkyl, $C_2-C_6$ alkoxyalkyl, $C_6-C_{10}$ aryl, glyoidyl, a group of the formula —(CH$_2$)$_t$—COO—Q or of the formula —(CH$_2$)$_t$—O—CO—Q wherein t is 1 or 2, and Q is $C_1-C_4$ alkyl or phenyl; or when n is 2, $R_7$ is $C_2-C_{12}$ alkylene, $C_6-C_{12}$ arylene, a group —$CH_2CH(OH)$—$CH_2$—O—X—O—$CH_2$—CH(OH)—$CH_2$— wherein X is $C_2-C_{10}$ alkylene, $C_6-C_{15}$ arylene or $C_6-C_{12}$ cycloalkylene, or a group —$CH_2CH(OZ')CH_2$—(OCH$_2$—CH(OZ')CH$_2$)$_2$— wherein Z' is hydrogen, $C_1-C_{18}$ alkyl, allyl, benzyl, $C_2-C_{12}$ alkanoyl or benzoyl;

$Q_1$ is —N($R_8$)— or —O—;

E is $C_1-C_3$ alkylene, the group —$CH_2$—$CH(R_9)$—O— wherein $R_9$ is hydrogen, methyl or phenyl, the group —(CH$_2$)$_3$—NH— or a direct bond;

$R_{10}$ is hydrogen or $C_1-C_{18}$ alkyl;

$R_8$ is hydrogen, $C_1-C_{18}$ alkyl, $C_5-C_7$ cycloalkyl, $C_7-C_{12}$ aralkyl, cyanoethyl, $C_6-C_{10}$ aryl, the group —$CH_2$—$CH(R_9)$—OH wherein $R_9$ has the meaning defined above; a group of the formula

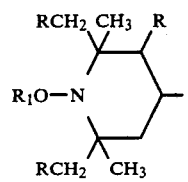

or a group of the formula

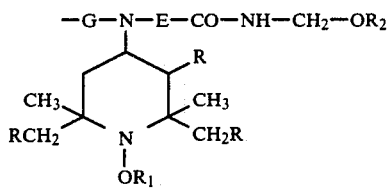

wherein G is $C_2-C_6$ alkylene or $C_6-C_{12}$ arylene; or $R_8$ is a group —E—CO—NH—CH$_2$—OR$_{10}$;

$T_3$ is ethylene or 1,2-propylene, or is the repeating structural unit derived from an alpha-olefin copolymer with an alkyl acrylate or methacrylate;

k is 2 to 100;

$T_4$ has the same meaning as $R_4$ when p is 1 or 2, $T_5$ is methyl, $T_6$ is methyl or ethyl, or $T_5$ and $T_6$ together are tetramethylene or pentamethylene;

M and Y are independently methylene or carbonyl;

$T_7$ is the same as $R_7$;

$T_{10}$ and $T_{11}$ are independently alkylene of 2 to 12 carbon atoms, or $T_{11}$ is

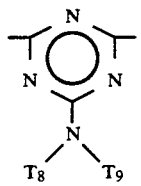

$T_{12}$ is piperazinyl,

—NR$_{11}$—(CH$_2$)$_a$—NR$_{11}$— or

—NH(CH$_2$)$_a$—N(CH$_2$)$_b$—N[(CH$_2$)$_c$—N]$_j$H where $R_{11}$ is the same as $R_3$ or is also

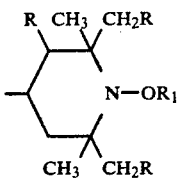

a, b and c are independently 2 or 3, and f is 0 or 1, e is 2, 3 or 4;

$T_{13}$ is the same as $R_2$ with the proviso that $T_{13}$ cannot be hydrogen when n is 1;

$E_1$ and $E_2$, being different, each are —CO— or —N-($E_5$)— wherein $E_5$ is hydrogen, $C_1$-$C_{12}$ alkyl or $C_4$-$C_{22}$ alkoxycarbonylalkyl.

$E_3$ is hydrogen, alkyl of 1 to 30 carbon atoms, phenyl, naphthyl, said phenyl or said naphthyl substituted by chlorine or by alkyl of 1 to 4 carbon atoms, or phenylalkyl of 7 to 12 carbon atoms, or said phenylalkyl substituted by alkyl of 1 to 4 carbon atoms;

$E_4$ is hydrogen, alkyl of 1 to 30 carbon atoms, phenyl, naphthyl or phenylalkyl of 7 to 12 carbon atoms, or $E_3$ and $E_4$ together are polymethylene of 4 to 17 carbon atoms, or said-polymethylene substituted by up to four alkyl groups of 1 to 4 carbon atoms;

$R_2$ of formula (N) is as previously defined when m is 1;

$G_1$ is a direct bond, $C_1$-$C_{12}$ alkylene, phenylene or —NH—G′—NH wherein G′ is $C_1$-$C_{12}$ alkylene; and $E_6$ is an aliphatic or aromatic tetravalent radical.

3. The composition of claim 2, wherein $R_1$ is other than hydrogen.

4. The composition according to claim 3 wherein the compound of component (b) is selected from the group consisting of di-(1-acetoxy-2,2,6,6-tetramethylpiperidin-4-yl)phthalate,
di-(1-acetoxy-2,2,6,6-tetramethylpiperidin-4-yl)isophthalate,
di-(1-acetoxy-2,2,6,6-tetramethylpiperidin-4-yl)sebacate,
di-(1-acetoxy-2,2,6,6-tetramethylpiperidin-4-yl)succinate,
di-(1-acetoxy-2,2,6,6-tetramethylpiperidin-4-yl)adipate,
di-(1-acetoxy-2,2,6,6-tetramethylpiperidin-4-yl)-n-butylmalonate,
di-(1-acetoxy-2,2,6,6-tetramethylpiperidin-4-yl) 2,2-diethylmalonate
poly- [6-[(1,1,3,3-tetramethylbutyl)-imino]-1,3,5-triazine-2,4-diyl][2-(1-acetoxy-2,2,6,6-tetramethylpiperidyl)-imino]-hexamethylene-[4-(1-acetoxy-2,2,6,6-tetramethylpiperidyl)-imino]
1,4-diaoetoxy-2,2,6,6-tetramethylpiperidine
1-acetoxy-4-hydroxy-2,2,6,6-tetramethylpiperidine
di-(1-propionoxy-2,2,6,6-tetramethylpiperidine-4-yl)adipate
di-(4-benzoyloxy-2,2,6,6-tetramethylpiperidine-4-yl)oxalate
(1-acetoxy-2,2,6,6-tetramethylpiperidin-4-yl)-4-hydroxy-3,5-di-tert.butylbenzoate
2-(4-hydroxy-3,5-di-tert.butylbenzyl)-2-(1-acetoxy-2,2,6,6-tetramethylpiperidin-4-yl) n-butylmalonate
N-(1-acetoxy-2,2,6,6-tetramethylpiperidin-4-yl)-N-(n-butyl)-4-(4-hydroxy-3,5-di-tert.butylbenzoyloxy)-3,5-di-tert.butylbenzamide
1,6-di-(N-acetyl-N-(1-acetoxy-2,2,6,6-tetramethylpiperidin-4-yl)]aminohexane
di-(1-acetoxy-2,2,6,6-tetramethylpiperidin-4-yloxy)-hexane-1,6-dicarbamate
1-acetoxy-4-(N-acetyl-N-n-dodecylamino)-2,2,6,6tetramethylpiperidine
di-(1-propionoxy-2,2,6,6-tetramethylpiperidin-4-yl) succinate
di-(4-n-octadecanoyloxy-2,2,6,6-tetramethylpiperazin-1-yl)oxalate
1,4-di-(2-ethylhexanoyloxy)-2,2,6,6-tetramethylpiperidine
di-(1-benzoyloxy-2,2,6,6-tetramethylpiperidin-4-yl) sebacate
1-benzoyloxy-4-(N-n-butyl-N-benzoylamino)-2,2,6,6-tetramethylpiperidine
(1-benzoyloxy-2,2,6,6-tetramethylpiperdin-4-yl)azepin-2-one
[1-benzoyloxy-1′-benzyloxy-di-(2,2,6,6-tetramethylpiperidin-4-yl)]isophthalate
1,4-di-(4-hydroxy-3,5-di-tert-butylbenzoyloxy)2,2,6,6-tetramethylpiperidine
n-butyl-(4-benzoyloxy-2,2,6,6-tetramethylpiperidin-4-yl)carbonate
1-carbamoyloxy-4-benzoyloxy-2,2,6,6-tetramethylpiperidine
di(1-carbamoyloxy-2,2,6,6-tetramethylpiperidin-4-yl)sebacate
di-(1-n-butylcarbamoyloxy-2,2,6,6-tetramethylpiperidin-4-yl)2,2-diethylmalonate
di-(4-benzoyloxy-2,2,6,6-tetramethylpiperidin-1-yl)2,4,4-trimethylhexane-1,6-dicarbamate
alpha,alpha′-(di-1-ethoxy-2,2,6,6-tetramethylpiperidin-4-yloxy)-p-xylene
4-benzyloxy-1-ethoxy-2,2,6,6-tetramethylpiperidine
1,4-dibenzyloxy-2,2,6,6-tetramethylpiperidine
alpha,alpha′-(di-1-benzyloxy-2,2,6,6-tetramethylpiperidin-4-yloxy)-p-xylene
di-(1-benzyloxy-2,2,6,6-tetramethylpiperidin-4-yl)sebacate
4-benzoyloxy-1-(alpha-methylbenzyloxy)2,2,6,6-tetramethylpiperidine
di-[1-(alpha-methylbenzyloxy)-2,2,6,6-tetramethylpiperidin-4-yl]sebacate
1,4-dimethoxy-2,2,6,6-tetramethylpiperidine
4-benzoyloxy-1-methoxy-2,2,6,6-tetramethylpiperidine
di-(1-methoxy-2,2,6,6-tetramethylpiperidin-4-yl) sebacate
di-(1-methoxy-2,2,6,6-tetramethylpiperidin-4-yl)succinate
(1-cyclohexyloxy-2,2,6,6-tetramethylpiperidin-4-yl)-3,5-di-t.butyl-4-hydroxybenzoate
1-cyclohexyloxy-4-octadecanoyloxy-2,2,6,6-tetramethylpiperidine
di-(1-methoxy-2,2,6,6-tetramethylpiperidin-4-yl)isophthalate
di-(1-cyclohexyloxy-2,2,6,6-tetramethylpiperidin-4-yl)sebacate
di-(1-cyclohexyloxy-2,2,6,6-tetramethylpiperidin-4-yl)isophthalate
di-(1-heptyloxy-2,2,6,6-tetramethylpiperidin-4-yl)sebacate
di-[1-(alpha-methylbenzyloxy)-2,2,6,6-tetramethylpiperidin-4-yl]terephthalate di-(1-ethoxy-2,2,6,6-tetramethylpiperidin-4-yl)sebacate di-(1-cumyloxy-2,2,6,6-tetramethylpiperidin-4-yl)sebacate 3,15-di-alpha-methylbenzyloxy-2,2,4,4,14,14,16,16-octamethyl-7,11,18,21-tetraoxa-3,15-diazatrispiro[5.2.2.5.2.2]heneicosane 3,15-dicyclohexyloxy-2,2,4,4,14,14,16,16-oxtamethyl-7,11,18,21-tetraoxa-3,15-diazatrispiro[5.2.2.5.2.2-]heneicosane di-(1-cyclohexyloxy-2,2,6,6-tetramethylpiperidin-4-yl)succinate di-[1-(alpha-methylbenzyloxy)-2,2,6,6-tetramethyl-piperidin-4-yl]succinate di-(1-nonyloxy-2,2,6,6-tetramethylpiperidin-4-yl)sebacate di-(1-octadecyloxy-2,2,6,6-tetramethylpiperidin-4-yl)sebacate di-(1-nonyloxy-2,2,6,6-tetramethylpiperidin-4-yl)succinate di-[1-(1-methylcyclohexyloxy)-2,2,6,6-tetramethyl-piperidin-4-yl]sebacate di-[1-(3-cyclohexen-1-yloxy)-2,2,6,6-tetramethyl-piperidin-4-yl]sebacate di-(1-tert.butoxy-2,2,6,6-tetramethylpiperidin-4-yl)sebacate di-(1-carbamoyloxy-2,2,6,6-tetramethylpiperidin-4-yl)n-butylmalonate di-[1-(bicyclo-[4.4.0]-decyl-1-oxy)-2,2,6,6-tetramethylpiperidin-4-yl]sebacate di-(1-n-butylcarbamoyloxy-2,2,6,6-tetramethylpiperidin-4-yl)phthalate di-(1n-butylcarbamoyloxy-2,2,6,6-tetramethylpiperidin-4-yl)n-butylmalonate di-(1-phenylcarbamoyloxy-2,2,6,6-tetramethylpiperidin-4-yl)sebacate 4-benzoyloxy-1-benzyloxy-2,2,6,6-tetramethylpiperidine di-(1-methoxy-2,2,6,6-tetramethylpiperidin-4-yl)(3,5-di-tert.butyl-4-hydroxybenzyl) n-butylmalonate 8-alpha-methylbenzyloxy-7,7,9,9-tetramethyl-8-aza-1,4-dioxaspiro[4.5]decane di-(1-cyclohexyloxy-2,2,6,6-tetramethylpiperidin-4-yl)(3,5-di-tert.butyl-4-hydroxybenzyl) n-butylmalonate di-(1-octyloxy-2,2,6,6-tetramethylpiperidin-4-yl) sebacate di-(1-octyloxy-2,2,6,6-tetramethylpiperidin-4-yl) succinate bis[N-(1-cyclohexyloxy-2,2,6,6-tetramethylpiperidin-4-yl)n-butylamino] sebacamide bis(1-cyclooctyloxy-2,2,6,6-tetramethylpiperidin-4-yl) sebacate N,N',N'',N'''-tetrakis{2,4-bis[N-(1-cyclohexyloxy-2,2,6,6-tetramethylpiperidin-4-yl)-n-butylamino]-1,3,5-triazin-6-yl}-3,3'-ethylenediiminodipropylamine 2,4-bis[N-(1-cyclohexyloxy-2,2,6,6-tetramethyl-piperidin-4-yl)-n-butylamino]6-t-octylamino-1,3,5-triazine 2,4-bis[N-(1-cyclohexyloxy-2,2,6,6-tetramethyl-piperidin-4-yl)-n-butylamino]-6-morpholino-1,3,5-triazine N,N'-bis(1-cyclohexyloxy-2,2,6,6-tetramethylpiperidine-4-yl)-N,N'-bis{2,4-bis[N-(1-cyclohexyloxy-2,2,6,6'-tetramethyl-piperidin-4-yl)n-butylamino]1,3,5-triazin-6-yl}hexamethylenediamine 2,4,6-tris[N-(1-cyclohexyloxy-2,2,6,6-tetramethyl-piperidin-4-yl)-n-butylamino]1,3,5-triazine and N-(1-cyclohexyloxy-2,2,6,6-tetramethylpiperidin-4-yl) succinimide.

5. The composition of claim 4, wherein said compound is di-(1-cyclohexyloxy-2,2,6,6-tetramethylpiperidin-4-yl)sebacate.

6. The composition of claim 4, wherein said compound is di-(1-cyclohexyloxy-2,2,6,6-tetramethylpiperidin-4-yl)isophthalate.

7. The composition of claim 4, wherein said compound is di-(1-heptyloxy-2,2,6,6-tetramethylpiperidin-4-yl)sebacate.

8. The composition of claim 4, wherein said compound is di-(1-ethoxy-2,2,6,6-tetramethylpiperidin-4-yl)sebacate.

9. The composition of claim 4, wherein said compound is 3,15-dicyclohexyloxy-2,2,4,4,14,14,16,16-octamethyl-7,11,18,21-tetraoxa-3,15-diazatrispiro[5.2.2.5.2.2]-heneicosane.

10. The composition of claim 3, wherein said compound is di-(1-cyclohexyloxy-2,2,6,6-tetramethylpiperidin-4-yl)succinate.

11. The composition of claim 3, wherein said compound is di-(1-alpha-methylbenzyloxy-2,2,6,6-tetramethylpiperidin-4-yl)-sebacate.

12. The composition of claim 3, wherein said compound is di-(1octyloxy-2,2,6,6-tetramethylpiperidin-4-yl)sebacate.

13. The composition of claim 1, wherein said organic polymer is polybutadiene, polyisoprene, polystyrene, a styrene copolymer, a styrene graft polymer, a halogen-containing vinyl homo- or copolymer, a polyvinyl chloride alloy, a polymer derived from an alpha,beta-unsaturated acid, a polymer derived from an unsaturated alcohol or its acyl or acetyl derivative, a polyacetal, a polyurethane, a polycarbonate, a polyamide or a polyester.

14. The composition of claim 13, wherein said organic polymer is polyvinyl chloride, a polyurethane or acrylonitrile/butadiene/styrene.

15. The composition of claim 14, wherein said organic polymer is polyvinyl chloride containing a thermal stabilizer therein.

16. The composition of claim 15, wherein in component (b) $R_1$ is $C_1$–$C_{18}$ alkyl, $C_2$–$C_{18}$ alkenyl, $C_2$–$C_{18}$ alkynyl, $C_5$–$C_{12}$ cycloalkyl, $C_6$–$C_{10}$ bicycloalkyl, $C_5$–$C_8$ cycloalkenyl, $C_6$–$C_{10}$ aryl, $C_7$–$C_9$ aralkyl or $C_7$–$C_9$ aralkyl substituted by alkyl or aryl.

17. The composition of claim 16, wherein said thermal stabilizer is selected from the group consisting of organotin, barium/cadmium, barium/zinc, calcium/zinc, antimony and lead compounds.

18. The composition of claim 16, wherein the organotin compound is selected from the group consisting of tin carboxylates, tin mercaptides and tin maleates.

19. The composition of claim 16, wherein said compound is di-(1-cyclohexyloxy-2,2,6,6-tetramethylpiperidin-4-yl)sebacate, di-(1-cyclohexyloxy-2,2,6,6-tetramethylpiperidin-4-yl)isophthalate, di-(1-heptyloxy-2,2,6,6-tetramethylpiperidin-4-yl)sebacate or di-(1-cyclohexyloxy-2,2,6,6-tetramethylpiperidin-4-yl)succinate.

20. The composition of claim 14, wherein said polymer is a polyurethane and said compound is di-(1-cyclohexyloxy-2,2,6,6-tetramethylpiperidin-4-yl)sebacate, di-(1-cyclohexyloxy-2,2,6,6-tetramethylpiperidin-4-yl)isophthalate, di-(1-ethoxy-2,2,6,6-tetramethylpiperidin-4-yl)sebacate or di-(1-octyloxy-2,2,6,6-tetramethylpiperidin-4-yl)sebacate.

21. The composition of claim 14, wherein said polymer is acrylonitrile/butadiene/styrene and said compound is di-(1-cyclohexyloxy-2,2,6,6-tetramethylpiperidin-4-yl)sebacate, 3,15-dicyclohexyloxy-2,2,4,4,14,14,16,16-octamethyl-7,11,18,21-tetraoxa-3,15-diazatrispiro[5.2.2,5.2.2]-heneicosane or di-(alpha-methylbenzyloxy-2,2,6,6-tetramethylpiperidin-4-yl)sebacate.

22. The composition of claim 14, wherein said organic polymer is a polyurethane containing a 2-(2'-hydroxyphenyl)-benzotriazole therein.

23. A method of stabilizing an organic polymer containing hetero atoms, double bonds or aromatic ring, against oxidative, thermal or actinic degradation which comprises incorporating into said organic polymer an effective stabilizing amount of component (b) according to claim 1.

* * * * *